US006549890B2

(12) United States Patent
Mundell et al.

(10) Patent No.: US 6,549,890 B2
(45) Date of Patent: *Apr. 15, 2003

(54) INTERACTIVE COMPUTER SYSTEM AND DATA ANALYSIS METHOD

(75) Inventors: Thomas Owen Mundell, Kansas City, KS (US); Jeffery Lyle Donner, Gladstone, MO (US)

(73) Assignee: SuperbServ, Inc., Lee's Summitt, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/939,415

(22) Filed: Aug. 29, 1997

(65) Prior Publication Data

US 2002/0046078 A1 Apr. 18, 2002

(51) Int. Cl.[7] .............................................. G06F 17/60
(52) U.S. Cl. ....................................................... 705/10
(58) Field of Search .......................... 705/10, 2, 3, 410; 707/104.1, 505; 345/173, 333; 235/375, 472; 702/5, 7, 61, 62

(56) References Cited

U.S. PATENT DOCUMENTS

| | | | |
|---|---|---|---|
| 4,012,720 A | 3/1977 | Call et al. ..................... 235/443 |
| 4,355,372 A | 10/1982 | Johnson et al. .......... 379/92.04 |
| 4,982,346 A | 1/1991 | Girouard et al. ............. 364/578 |
| 5,023,435 A | 6/1991 | Deniger ....................... 235/375 |
| 5,041,972 A | 8/1991 | Frost ............................ 705/10 |
| 5,229,694 A | 7/1993 | Takahara et al. ............. 313/265 |
| 5,237,157 A | 8/1993 | Kaplan ........................ 235/375 |
| 5,305,197 A | 4/1994 | Axler et al. ................... 705/14 |
| 5,361,200 A | 11/1994 | Weybright et al. ............. 705/10 |
| 5,490,060 A | 2/1996 | Malec et al. ................... 705/10 |
| 5,535,118 A | 7/1996 | Chumbley .................. 235/37.5 |
| 5,710,900 A | * 1/1998 | Anand et al. ................ 345/339 |
| 5,764,221 A | * 6/1998 | Willard ....................... 345/173 |
| 5,778,350 A | * 7/1998 | Adams et al. .................. 707/1 |
| 5,786,815 A | * 7/1998 | Ford ........................... 345/333 |
| 5,832,496 A | * 11/1998 | Anand et al. ................ 707/102 |
| 6,229,694 B1 | * 5/2001 | Kono ......................... 361/683 |

OTHER PUBLICATIONS

Anton, Jon; "Customer Relationship Management", Chapters 7 & 8, p. 94–125.

* cited by examiner

*Primary Examiner*—Thomas A. Dixon
(74) *Attorney, Agent, or Firm*—Thompson Coburn LLP; Caroline G. Chicoine

(57) ABSTRACT

The present invention relates to an interactive computer system and method for collecting and analyzing user response data. The system includes a portable, compact re-programmable data device, the user interface of which is defined via an input program created on a computer and transferred from it to the data device. The user response data collected by the data device is transferred to an output table stored in the computer which is directly created from the input program without the need for additional programming. The user response data stored in the output table may then be analyzed via a data analysis mechanism also stored in the computer. The data analysis mechanism includes data analysis software and a plurality of customizable data analysis templates stored separately from the data analysis software, such that a data analyst can automatically and selectively configure the data analysis mechanism without the need for additional programming. The present invention is also directed to the data device itself, which can be implemented either via hardware or software.

12 Claims, 22 Drawing Sheets

FIG. 7

| SCREEN STYLE FIELD (0-15) 68 | DATA TYPE FIELD (0-15) 70 | SCREEN CHANGE FIELD (0-15) 72 | TIMER CONTROL FIELD (0-15) 74 |
|---|---|---|---|
| 0 – NO BACKGROUND<br>1 – QUESTION/10 RESPONSE<br>2 – QUESTION/5 RESPONSE<br>3 – SHORT MESSAGE<br>4 – LONG MESSAGE<br>5 – BULLET POINT<br>6 – NUMERIC ENTRY<br>7 – HORIZONTAL GRAPHIC<br>8 – VERTICAL GRAPHIC<br>9 – FULL-SCREEN GRAPHIC | 0 – NO DATA<br>1 – 1 BYTE INTEGER<br>2 – 2 BYTE INTEGER<br>3 – 3 DIGIT NUMERIC ENTRY<br>4 – 4 DIGIT NUMERIC ENTRY<br>5 – 5 DIGIT NUMERIC ENTRY<br>6 – 6 DIGIT NUMERIC ENTRY<br>7 – 7 DIGIT NUMERIC ENTRY<br>8 – 8 DIGIT NUMERIC ENTRY<br>9 – 9 DIGIT NUMERIC ENTRY<br>10 – 10 DIGIT NUMERIC ENTRY | 0 – NO DELAY<br>1 – 1 SECOND<br>2 – 2 SECONDS<br>3 – 5 SECONDS<br>4 – 10 SECONDS<br>5 – 15 SECONDS<br>6 – 30 SECONDS<br>7 – 45 SECONDS<br>8 – 1 MINUTE<br>9 – 2 MINUTES<br>10 – 5 MINUTES<br>11 – 10 MINUTES<br>12 – 15 MINUTES<br>13 – 20 MINUTES<br>14 – 25 MINUTES<br>15 – 30 MINUTES | 0 – NO TIMER<br>1 – START TIMER<br>2 – STOP TIMER<br>3 – PAUSE TIMER<br>4 – RESUME TIMER |

FIG. 8A

| Are you communicating via: | |
|---|---|
| Inbound Phone | |
| Outbound Phone | |
| Fax | |
| E-Mail | |
| Other | |

Thank you for completing the survey! Your comments are very valuable to us as we strive to improve our service level.

| ID | SERIAL NUMBER | NAME | DEALER REGION | DEALER SIZE |
|---|---|---|---|---|
| 1 | 197056 | BROWN MOTORS | SOUTH | AVERAGE VOLUME |
| 2 | 197088 | CONVENTIONAL – WOODVALE PARK | NORTHEAST | HIGH VOLUME |
| 3 | 197233 | COWTOWN AUTO PLAZA | MIDWEST | LOW VOLUME |

FIG. 10B

| ID | GROUP NAME | GROUP 1 | GROUP 2 | GROUP 3 | GROUP 4 | GROUP 5 |
|---|---|---|---|---|---|---|
| 1 | DEALER REGION | NORTHEAST | SOUTH | MIDWEST | UPPER MIDWEST | WEST |
| 2 | DEALER SIZE | HIGH VOLUME | AVERAGE VOLUME | LOW VOLUME | - | - |

FIG. 13

| ID | DATE | TIME | DATA FIELD 1 | ⌇ | DATA FIELD (N-1) | DATA FIELD N |
|---|---|---|---|---|---|---|
| SERIAL NUMBER | M/D/YY | HH:MM:SS | 1-255 | | 1-65,XXX SEC. | 1-255 |
| XXXXXX (3 BYTE INTEGER) | (3 BYTE) | AM/PM (3 BYTE) | 1 BYTE INTEGER DATA | | 2 BYTE TIMESTAMP DATA | 1 BYTE INTEGER DATA |

21   120   122   124

197177,7/1/98,09:54:33 AM,1,....,336,5
197177,7/1/98,10:07:46 AM,2,....,517,4
197177,7/1/98,10:34:33 AM,1,....,238,0

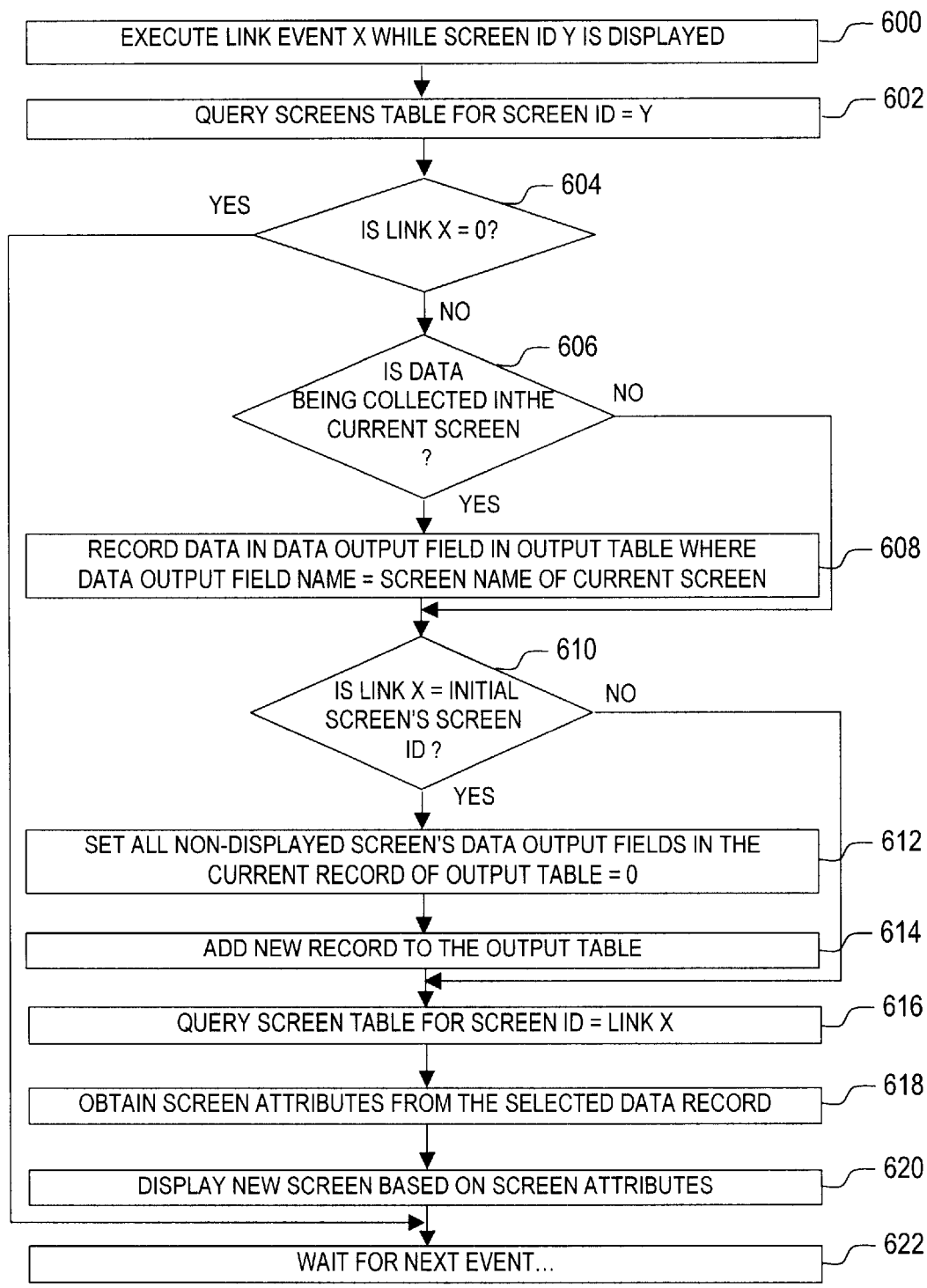

INTERACTIVE COMPUTER SYSTEM AND DATA ANALYSIS METHOD

FIELD OF INVENTION

The present invention relates to an interactive computer system having a re-programmable data device and, more particularly a portable, stand-alone re-programmable data device whose user interface can be easily programmed and reprogrammed for use in a plurality of different applications. The present invention also relates to an interactive computer system in which the data device is implemented via software. The present invention also relates to a method of analyzing data whereby the analysis of the data can be automatically and selectively configured.

BACKGROUND OF THE INVENTION

In today's fierce competitive marketplace, a business must have a clear understanding of what factors will boost productivity and customer satisfaction in order to "stay ahead of the pack." Typically, businesses hire outside consultants and conduct market surveys in order to determine what these factors may be. In both cases, the collection and analysis of large amounts of data is involved. The ability to quickly identify these factors is crucial to the survival of any business in today's marketplace. However, in many situations, data collection and analysis can prove to be an arduous task, and for many companies, the cost and time involved far exceeds the perceived benefits.

Several devices have been developed in order to collect and analyze data. Existing systems, however, are generally designed around a customized PC-style device and include more electronic components than are typically necessary in most data collection situations. Such components not only increase the cost and complexity of these devices, but also necessitate greater physical space. In situations where space is at a premium, such as on an employee's desk inside a cubicle or near a cash register at a store, or where the need for data collection is only temporary, a full-size PC-style device or kiosk for data collection is unwieldy and impractical, and in some cases may not be a viable solution. The large number of components also increases the maintenance requirements of these devices as well as the risk of malfunctions.

While some compact, stand-alone data collection systems exist, they are limited in both their flexibility to perform different kinds of data collection, and in their ability to be easily and quickly reprogrammed. For example, a company that is collecting data in its factory may want to collect data on what is causing a recent manufacturing defect. However, one month later it may have another problem that it needs to track. None of the existing data collection devices provide a compact data collection device that can be easily and quickly configured to handle a plurality of different data collection applications. In U.S. Pat. No. 4,355,372, the data collection device is designed only for market research and has a predefined set of instructions it follows for each piece of data that is collected. The device cannot be used for data collecting applications outside of market surveys. Moreover, the device cannot be easily reconfigured to cover different types and lengths of surveys. Such limitations greatly decrease the utility of existing data collection devices.

Data is generally only useful to a business once it is analyzed. Under existing systems, the analysis step is independent and separate from the data collection step. The user, for example, has to create an analytical tool, such as a spreadsheet program, and import the collected data into it. Not only is such a method time consuming, it requires a skilled person to analyze the data, thereby increasing the overall costs of such systems. Moreover, the longer the delay in analyzing the data, the longer it takes a company to identify the above-mentioned factors and implement the necessary changes and improvements, which can mean the difference between staying in business or going out of business.

Another key factor in the success of any business is the ability to provide information to customers or employees in a fast and efficient manner. Unfortunately, with the recent trend in downsizing, businesses cannot always afford to hire a staff large enough to fully service their customers or to provide their employees with the necessary knowledge to do their job satisfactorily. While some businesses have used computers to replace their human counterparts, they are not always a cost effective alternative. Moreover, many existing systems cannot be easily and quickly reprogrammed so that the information provided to the customers or employees can be continuously updated or changed.

Accordingly, there is a need for an interactive computer system having a portable, compact re-programmable data device that can be easily and quickly reconfigured so that it can be used in a plurality of different applications. There is also a need for an easy-to-use data analysis tool that can be automatically and selectively configured.

SUMMARY OF THE INVENTION

The present invention relates to an interactive computer system and data analysis method.

In accordance with one embodiment of the invention, a data device is provided which includes a housing, a display mechanisms included on the housing for displaying a plurality of display screens to a user of the data device, an input mechanism included on the housing for inputting at least one of user response data and user commands to the data device, a processor contained within the housing which is adapted to control the operation of the data device, and memory coupled to the processor for storing operating software for operating the data device and for storing an input program defining a user interface for the data device, whereby the data device can be easily programmed and re-programmed to be used for a plurality of different applications. The memory includes a re-programmable single-chip first memory device adapted to store the operating software, and a re-programmable single-chip second memory device adapted to store the input program. The data device further includes communications mechanism included on the housing for allowing communication between the data device and a remote computer, such that the input program may be transferred from the computer to the data device. The input program may alternatively be stored on a remote computer and the memory of the data device includes software stored therein for accessing the input program from the remote computer.

In another embodiment of the invention, an interactive computer system is provided which includes the data device as described above and a computer having a computer communications mechanism for connecting it to the data device communications mechanism of the data device. The computer includes a programming mechanism for creating the input program, whereby the data device can be easily programmed and re-programmed to be used for a plurality of different applications. The memory of the data device includes an output storage mechanism for storing user response data inputted to the data device. The programming mechanism of the computer includes an output table created directly from the input program without the need for additional programming, whereby the output table is adapted to store the user response data inputted to the data device when transferred from the output storage mechanism of the memory of the data device to the computer. The input program includes a screen creation mechanism for creating the display screens of the data device, and a link mechanism for linking at least one of the display screens to at least another of the display screens based on at least one of a timer, an external event received by the data device via the data device communications mechanism and the user response data inputted to the data device.

The programming mechanism of the computer also includes a data analysis mechanism for allowing a data analyst to analyze the user response data stored in the output table of the computer. The data analysis mechanism includes data analysis software stored within the computer for analyzing the user response data stored in the output table, and a plurality of customizable data analysis templates stored within the computer independently of the data analysis software such that the data analyst can automatically and selectively configure the data analysis mechanism. The data analysis mechanism further includes a template selection mechanism for selecting one of the plurality of data analysis templates so that the user response data analyzed by the data analysis software can be displayed in a plurality of configurations. The data analysis templates include a graphic selection mechanism for selecting a graphical layout for displaying the user response data analyzed by the data analysis software; and a filtering mechanism for filtering the user response data analyzed by the data analysis software based on a plurality of filter criteria. The programming mechanism of the computer further includes a test mechanism for testing the input program on the computer prior to transferring the input program to the memory of the data device. The graphical layout includes a plurality of graphs, and the filter mechanism further includes a local graph filter mechanism for filtering the user response data stored in the output table on one of the graphs, and a global graph filter mechanism for simultaneously filtering the user response data stored in the output table on all of the graphs.

In another embodiment of the invention, a method of providing data to a user is provided. The method includes the steps of providing a user with a data device as described above, creating the input program via the computer, connecting the data device to the computer via the data device communications mechanism and the computer communications mechanism, and transferring the input program from the computer to the memory of the data device. The method may also include the steps of creating an output table within the computer directly from the input program without the need for additional programming, transferring the user response data inputted to the data device to the output table within the computer, and analyzing the user response data stored in the output table via a data analysis mechanism stored within the computer. The step of creating the input program further includes the steps of creating the display screens to be displayed on the display of the data device, and linking at least one of the display screens to at least another of the display screens based on at least one of a timer, an external event received by the data device via the data device communications mechanism, and the data inputted to the data device via the input mechanism. The step of analyzing further includes the step of selecting a plurality of customizable data analysis templates stored within the computer, such that a data analyst can automatically and selectively configure the data analysis mechanism whereby the analyzed user response data can be displayed in a plurality of configurations. The step of analyzing may further include the steps of selecting a graphical layout for displaying the user response data analyzed by the data analysis mechanism, and filtering the user response data based on a plurality of filter criteria. The graphical layout includes a plurality of graphs, and the step of filtering also includes the steps of local graph filtering the user response data on one of the graphs selected by the data analyst, and global graph filtering the user response data on all of the graphs selected by the data analyst.

In another embodiment of the invention, a method of analyzing user response data stored within a computer having data analysis software and at least one customizable data analysis template stored within it independently from the data analysis software so that a data analyst can automatically and selectively configure the data analysis mechanism. The method includes the steps of selecting one of the data analysis templates, and analyzing the data based on the data analysis template selected by the data analyst.

BRIEF DESCRIPTION OF THE DRAWINGS

FIG. 7 is an example of a plurality of screen attributes defined by the input program fields of the input program record of FIG. 5;

FIGS. 8A and 8B are examples of a display screen to be displayed on the display of the data device of FIG. 2;

FIGS. 10A and 10B are examples of filter tables of the input program created by the computer of FIG. 1;

FIG. 13 is an example of an output record for storing the user response data collected by the data device of FIG. 2;

FIG. 22 displays a flowchart for implementing the data device of FIG. 2 via software.

DETAILED DESCRIPTION OF THE PREFERRED EMBODIMENTS

The present invention relates to an interactive computer system and method for collecting and analyzing data. The system includes a portable, re-programmable data device, the user interface of which is defined via an input program created on a computer and transferred from it to the data device. The data collected by the data device is transferred to an output table stored in the computer which is directly created from the input program without the need for additional programming. The data in the output table may then be analyzed via a data analysis mechanism also stored in the computer. The data analysis mechanism includes data analysis software and a plurality of customizable data analysis templates stored separately from the data analysis software, such that a data analyst can automatically and selectively configure the data analysis mechanism without the need for additional programming. The present invention is also directed to the data device itself, which can be implemented either via hardware or software.

Figure 1:
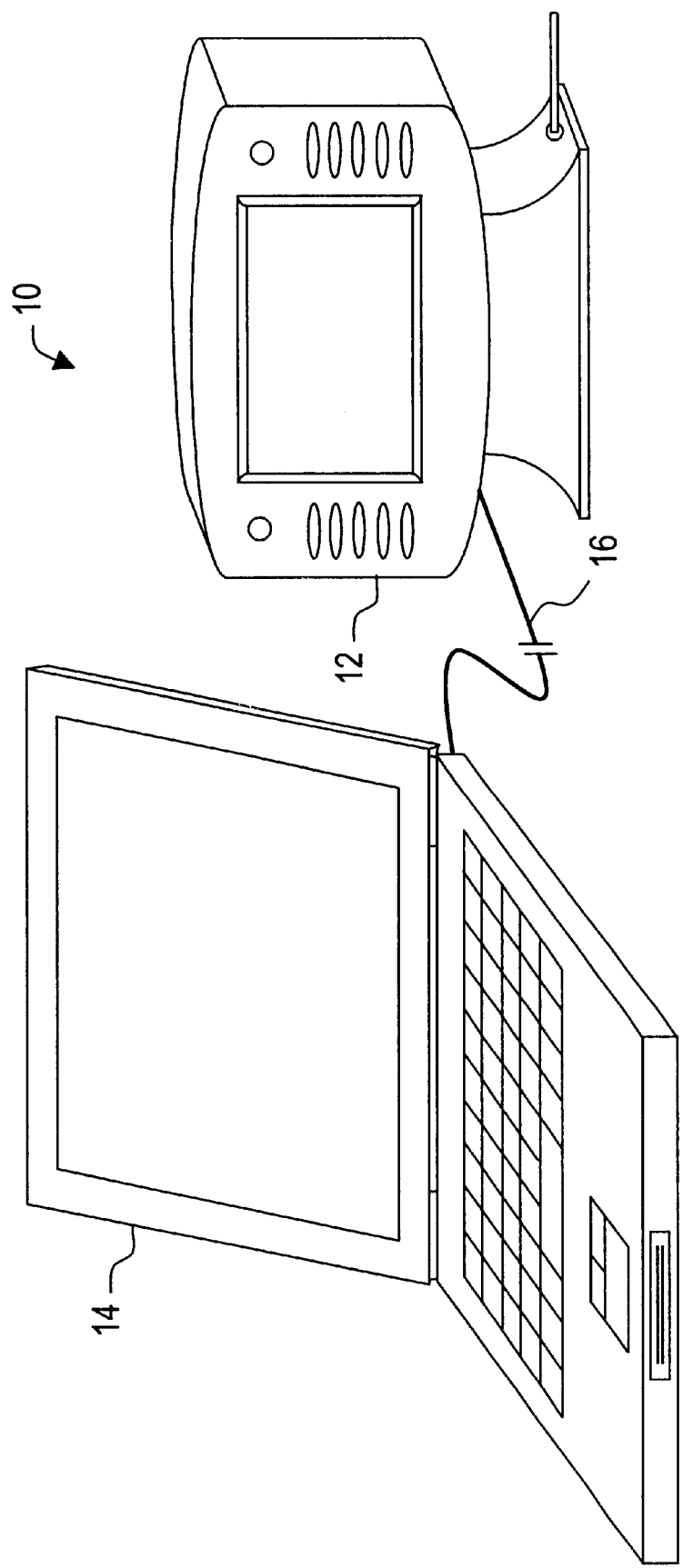
FIG. 1 is a perspective view of one embodiment of the interactive computer system of the present invention.

Referring now to FIG. 1, there is shown an interactive computer system 10 of the present invention. Computer system 10 includes a programmable data device 12 and a computer 14. Data device 12 and computer 14 are connected via a communication cable 16. While data device 12 and computer 14 are shown connected in FIG. 1, this connection is only necessary when data needs to be transferred between data device 12 and computer 14. In a preferred embodiment, computer 14 is an IBM-compatible personal computer and communications cable 16 is an RS232 cable. It can be understood by one skilled in the art, however, that data device 12 and computer 14 may communicate with each other through other mediums, such as via modem (not shown).

Figure 2:
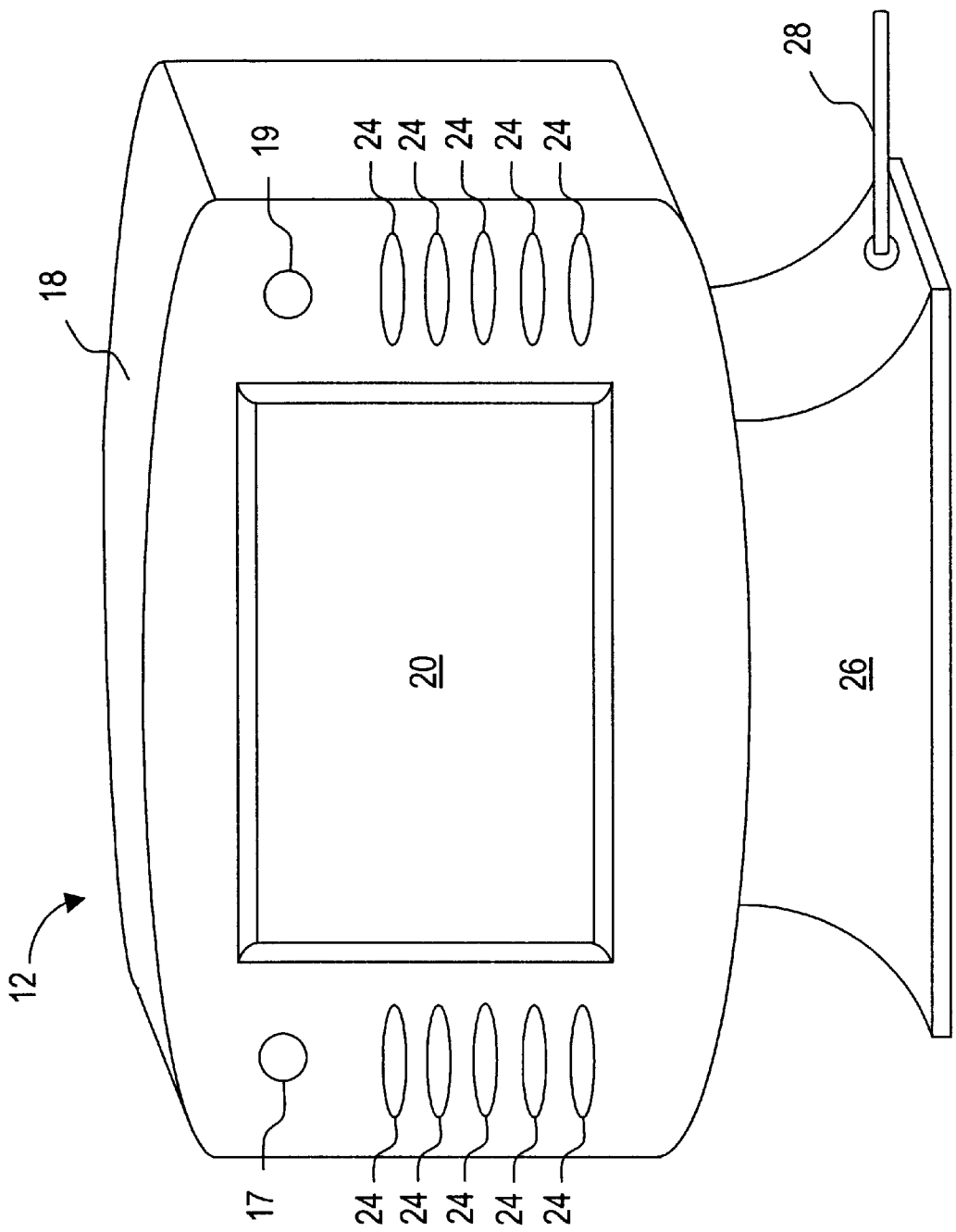
FIG. 2 is a front perspective view of the programmable data device of the interactive computer system shown in FIG. 1.

Referring now to FIG. 2, data device 12 includes a housing 18 having a display 20 for displaying a plurality of display screens 22 (see FIGS. 8A and 8B) to a user of data device 12. Housing 18 also includes an input mechanism 23 (see FIG. 4) in the form of a plurality of input keys 24 for inputting user response data to data device 12. It can be understood by one skilled in the art, however, that any other input mechanism, such as a keyboard or touch screen, may also be used. In one preferred embodiment, data device 12 is 7½ inches wide, 5½ inches high and weighs approximately 1½ pounds. Data device 12 may further include a base 26 for placing data device 12 on a surface. Given the portable and lightweight nature of data device 12, the underside of base 26 (not shown) may include a rubber material and base 26 may include a securing mechanism 28 for securing data device 12 to a surface via vacuum. Data device 12 may also include an undo button 17 for allowing a user of data device 12 to undo the last input key 24 pressed. Data device 12 may also preferably include a control button 19 for controlling various attributes of data device 12, such as for example, the attributes of display screen 22 (e.g. contrast and brightness).

Figure 3:
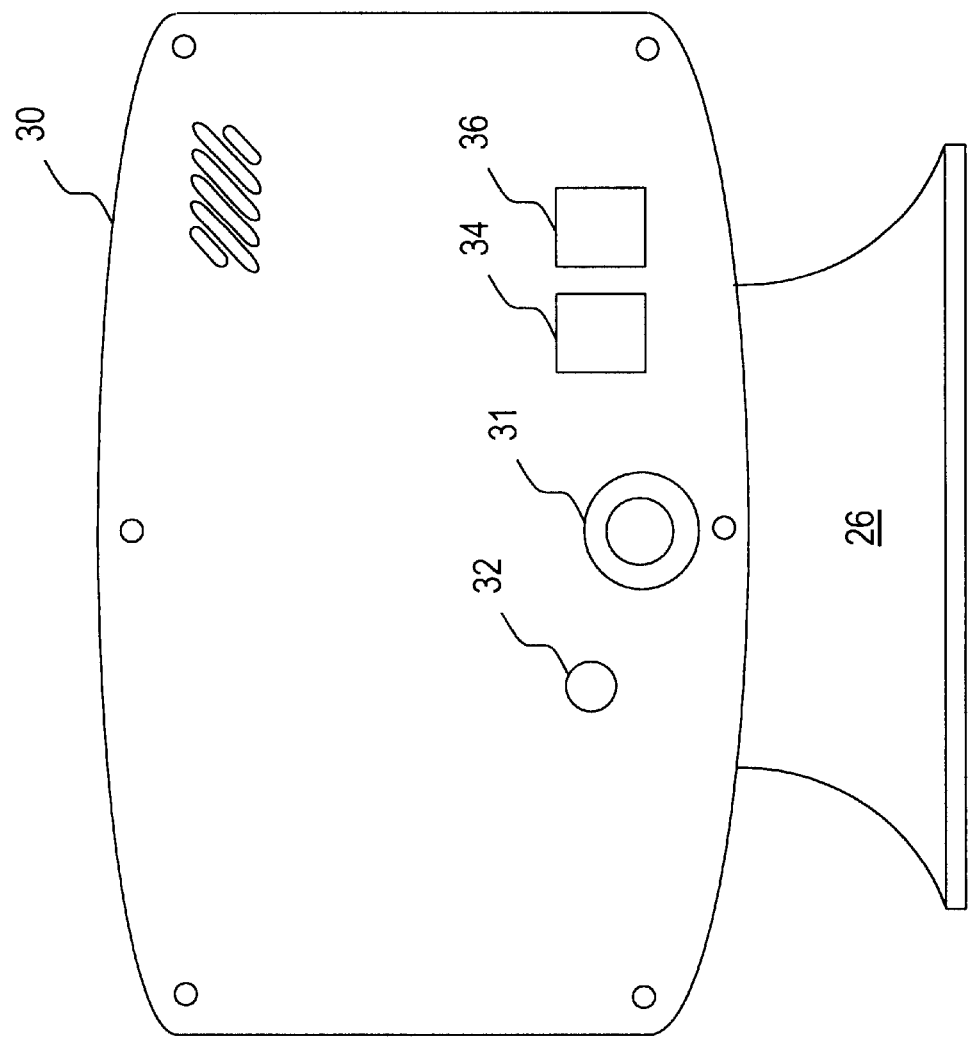
FIG. 3 is a rear plan view of the programmable data device of FIG. 2.

Referring now to FIG. 3, data device 12 includes a rear panel 30 having a power port 32 for receiving power for data device 12, and a first data device communications port 34 for allowing communication between data device 12 and a remote computer such as computer 14 of FIG. 1. Rear panel 30 may also include a second data device communications port 36 for receiving information from external sources, such as a telephone line. In a preferred embodiment, first and second data device communications ports 34 and 36 are RJ11 phone jacks implementing an RS232 protocol. Rear panel 30 may also preferably include a mounting connection 31 for permitting data device 12 to be mounted to another structure, such as a wall or stand.

Figure 4:
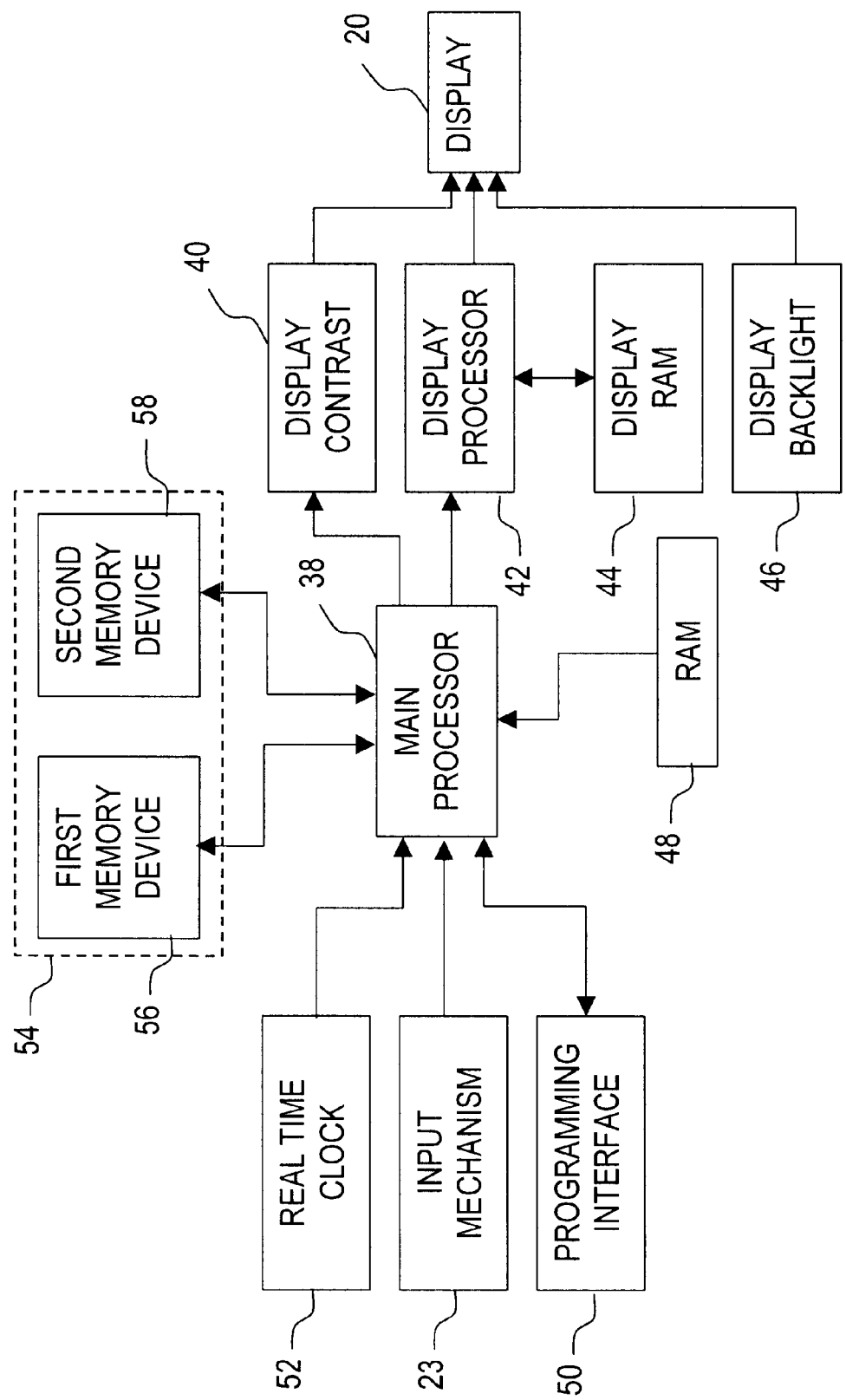
FIG. 4 is a schematic diagram of the various components of the programmable data device of FIG. 2.

Referring now to FIG. 4, the components within housing 18 of data device 12 are shown. The components include a processor 38 for controlling the operation of data device 12. Processor 38 is coupled to display 20 via a plurality of display components which control the operation of display 20, including a display contrast mechanism 40 and a display processor 42. Display processor 42 is in turn connected to a display memory device 44. Display 20 also includes a display backlight 46. Processor 38 is also coupled to input mechanism 23 of data device 12 and may be coupled to a timer 52 for timing various events, such as how long a certain display screen 22 has been active.

Processor 38 is also coupled to a memory device 54 for storing the operating software for operating data device 12, and for storing input program which defines the user interface to displayed via display 20 of data device 12. In a preferred embodiment, memory device 54 includes a first memory device 56 and a second memory device 58 separate and independent from first memory device 56. First memory device 56 preferably stores the operating software for data device 12. Second memory device 58 preferably stores the input program for data device 12, as well as user response data when it is being collected by data device 12. Processor 38 is also preferably coupled to an additional memory device 48 depending on the memory requirements of data device 12. Processor 38 is connected to first and second data device communications ports 34 and 36, respectively, through a programming interface 50. Processor 38, memory device 54, and additional memory device 48 are preferably contained on a single circuit board (not shown). In a preferred embodiment, display 20 is an Optrex 320×240 pixel graphic LCD, display processor 42 is an Epson IC Controller, processor 38 is a Motorola MC 68HC11 microprocessor, additional memory device 48 is a Mosel-Vitelic 32K×8 Static RAM, first memory device 56 is a Microchip 8K×8 EEPROM, and second memory device 58 is an Atmel 2 Megabit flash memory. It can be understood by one skilled in the art, however, that these preferred devices are not critical to the invention and can be changed depending on the memory and processing requirements of data device 12.

Figure 5:
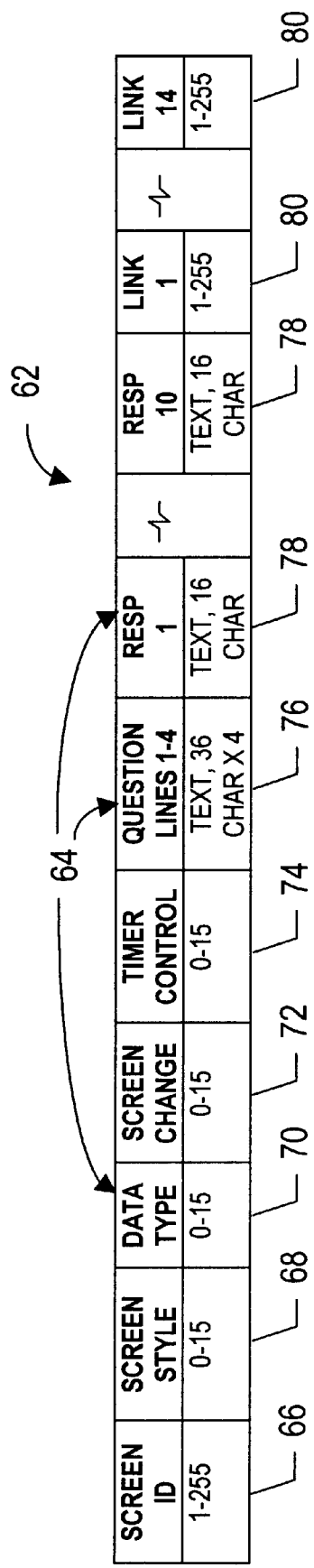
FIG. 5 is an example of an input program record of the input program created by the computer of FIG. 1.

Referring back to FIG. 1, computer 14 comprises a programming mechanism (not shown) for creating the input program to be stored on second memory device 58 of data device 12. As is further shown in FIG. 5, each display screen 22 to be displayed on display 20 of data device 12 corresponds to an input program record 62 consisting of a plurality of input program fields 64 which in turn define a plurality of screen attributes for each display screen 22, as well as how data device 12 will function. Preferably, input program fields 64 include a screen id field 66, a screen style field 68, a data type field 70, a screen change field 72, a timer control field 74, a question field 76, a plurality of response fields 78, and at least one link field 80 per link event (as further defined herein). Screen id field 66 represents a unique number assigned to each display screen 22. For illustrative purposes only, screen id field 66 allows for the assignment of up to 255 display screens. However, it can be understood by one skilled in the art that the number of display screens 22 may be increased or decreased depending on the memory requirements of data device 12 and the application or applications for which data device 12 is being used.

Screen style field 68 defines how each display screen 22 is displayed to a user of data device 12. Preferably, screen style field 68 allows for up to fifteen different screen styles. Data type field 70 defines what type of user response data, if any, is to be collected from each display screen 22. Preferably, data type field 70 allows for up to fifteen data types. Screen change field 72 defines a screen change event which triggers a display screen 22 to change in a specified amount of time. Screen change field 72 preferably allows for up to fifteen different screen change events. Timer control field 74 controls timer 52 of data device 12 and preferably allows for up to fifteen different timer function attributes, such as "start timer", "stop timer" and "resume timer."

Question field 76 comprises the question being asked or information being provided to a user of data device 12. Response fields 78 define the available response or responses displayed to the user of data device 12 via display 20. The length of each response field 78 is based on the screen style defined in screen style field 68. Preferably, question field 76 allows for a question or questions having a total length of up to 144 bytes, and response fields 78 preferably allow for responses having a total length of up to 160 bytes. For example, where five responses are to be displayed on display screen 22, each response field 78 would have a length of 32 bytes each. Each link field 80 defines a link event which if active, loads a new display screen 22 onto display 20. Such link events may include, without limitation, those based on user response data inputted to data device 12 via input keys 24, timer 52 (e.g., a timed display screen change), and an external event received by data device 12, such as the receipt of a telephone call via first or second data device communications ports 34 and 36, respectively. In a preferred embodiment, if the link event defined in link field 80 is "0", (i.e., inactive event), a new display screen 22 will not be loaded onto display 20 when a link event is activated.

Figure 6:
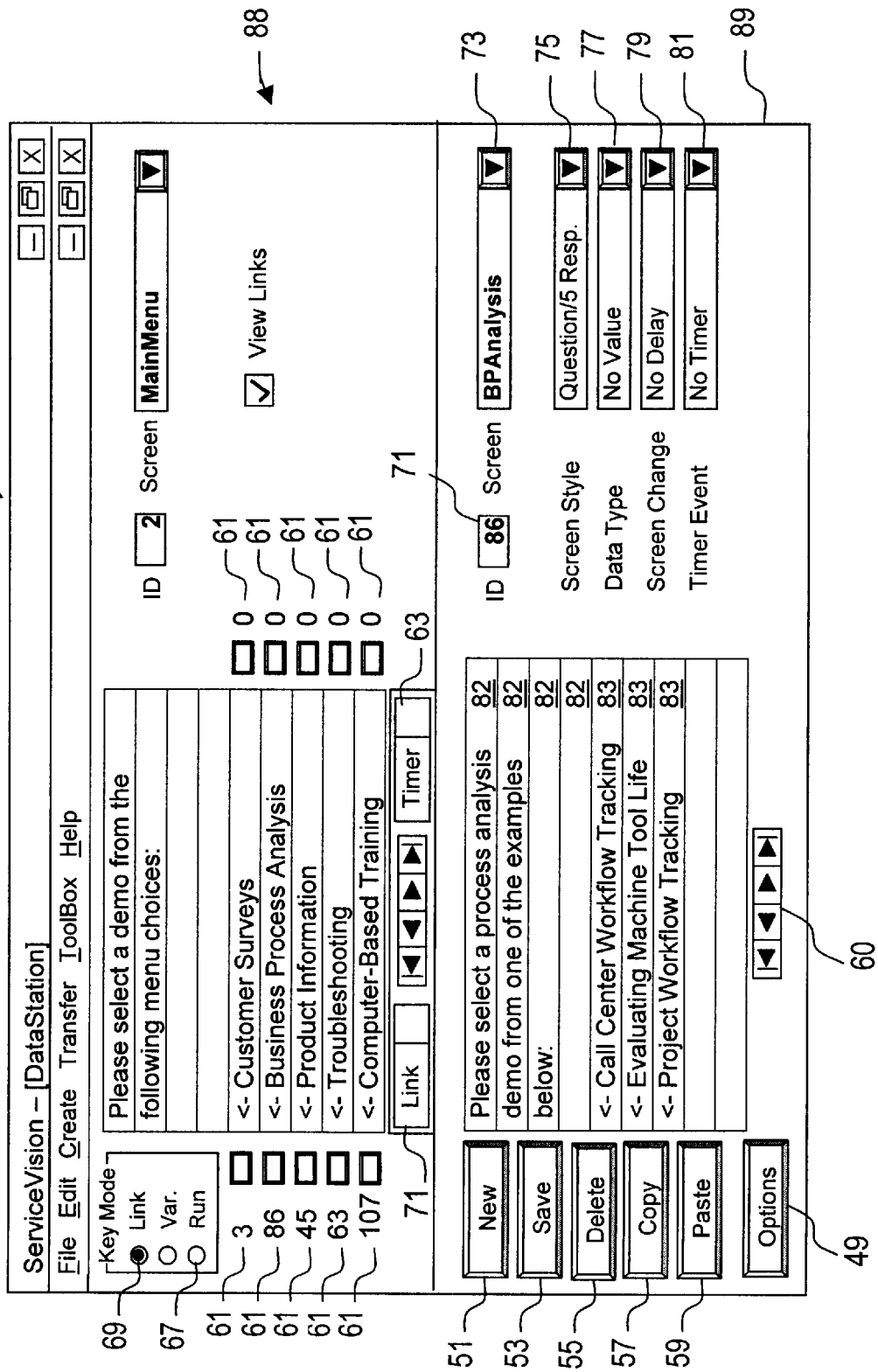
FIG. 6 is an example of a display screen form used to create the input program record of FIG. 5.

Referring now to FIG. 6, the input program is created via a create screens form 84 stored within computer 14. Preferably, the creation of the input program is menu-driven whereby the display screens 22 are defined by a user of computer 14 through the use of pull down menus. As shown in FIG. 6, create screens form 84 is divided into a top portion 88 and a bottom portion 89. Top portion 88 allows a user to define link fields 80, as well as to test the input program before it is transferred to data device 12. Referring to bottom portion 89, a new screen button 51 is provided which, when pressed, allows the user to create a new blank display screen 22. Bottom portion 89 of create screens form 84 also includes a plurality of screen form fields which correspond to input program fields 64 of input program record 62. In particular, the screen forms fields include a screen id form field 71 which contains a unique, pre-assigned number for each display screen 22 to be created, and a screen name form field 73 for assigning a screen name to that screen number. Screen form fields also include a screen style form field 75 for selecting a screen style, a data type form field 77 for selecting a data type, a screen change form field 79 for selecting a screen change event, and a timer control form field 81 for selecting a timer function attribute for the display screen 22 identified in screen id form field 71.

Bottom portion 89 of create screens form 84 also includes a question form field 82 into which the user can enter text and/or graphics. Bottom portion 89 of create screens form 84 may also include a plurality of justification buttons 85 for providing left, center and/or right justification of the text contained in question form field 82. Bottom portion 89 of create screens form 84 also includes one or more response form fields 83 into which the user can enter one or more responses. Bottom portion 89 also includes a save screen button 53 for saving a particular display screen 22 created by the user, a delete screen button 55 for allowing a user to delete a particular display screen 22, a copy screen button 57 and paste screen button 59 for allowing a user to copy the contents and attributes of one display screen 22 and paste it to another screen display 22. Bottom portion 89 may also include a plurality of display screen scroll buttons 60 for allowing the user to scroll between display screen 22, as well as an options button 49 from which further options for creating the input program are available, such as pulling up another form to create and store standard responses for response fields 83, or to change the defaults of the plurality of screen attributes for any given display screen 22. Such a configuration further facilitates the ease and quickness of creating the input program.

Referring further to FIG. 7, an example of various screen attributes available for screen style field 68, data type field 70, screen change field 72 and timer control field 74 are shown. Based on the screen attributes shown in FIG. 7, if a user wished to create a display screen 22 having one question and ten responses, such as screen display 22' as shown in FIG. 8A, she would select "Question/10 Resp" from the pull down menu of screen style form field 75. Likewise, if a user wanted to create a display screen 22 having a short message such as display screen 22" as shown in FIG. 8B, she would select "short message" from the pull down menu of screen style form field 75. If a user wanted to accept a one byte numerical user response data from a user of data device 12, she would select "one byte integer" from the pull down menu of data type form field 77. If a user of computer 14 wanted a display screen 22 to change upon 30 seconds if no other active link event is activated, she would select "30 seconds" from the pull down menu of screen change form field 79. If a user of computer 14 wanted to start timer 52 upon the activation of a certain display screen 22, she would select "start timer" from the pull down menu of timer control form field 81. It can be understood by one skilled in the art that the screen attributes identified in FIG. 7 are for illustrative purposes only and that they can be changed or expanded according to the particular application for which data device 12 is being used.

As display screens 22 are created in bottom portion 89 of create screens form 84, they can be linked together based on various link events, such as the depression of an input key 24, timer 52 or the receipt of an external event such as an incoming telephone call via first or second data device communications port 34 or 36, respectively. Display screens 22 are linked together through top portion 88 of create screens form 84. In particular, top portion 88 includes a link mode button 69 for setting top portion 88 into a link mode, and a plurality of input key link fields 61 corresponding to input keys 24 of data device 12 into which a screen id number of a certain display screen 22 may be entered. In the create screens form 84 shown in FIG. 6, when the display screen 22 having screen id number "2" is being displayed to a user of data device 12 in upper portion 88 of create screens form 84 and the user pushes the third input key 24 on the left side of display 20, the link event defined in the corresponding input key link field 61 will be "fired" such that display screen 22 is changed to the display screen having screen id number "45". Likewise, if a user of data device 12 presses the third input key 24 on the right hand side of display 20, nothing will happen since the link event defined in the corresponding input key link field 61 for that input key 24 has been set to "0".

A certain display screen 22 may also be linked to another display screen 22 based on a timed event, such as the time a display screen 22 has been displayed on display 20. The timed event is set via timer event link field 63. Top portion 88 may also be provided with a global link field 65 which allows a user to simultaneously link a plurality of the input keys 24 to a certain display screen 22. For example, if the number "3" was entered into input key link field 65 and link button 7 is pressed, the link event for the first three input keys 24 on the left hand side of that particular display screen 22 would be set such that the current display screen 22 would change to the display screen 22 having screen id number shown in screen id form field 71 of bottom portion 89 when the user of data device 12 pushed any of these three input keys 24.

Once two or more of display screens 22 have been created and saved, top portion 88 of create screens form 84 also allows the user to test the input program by emulating data device 12. Create screens form 84 is set in a run mode by pushing a run mode button 67. With this unique feature, all problems or errors with the input program can be corrected before the input program is actually transferred to data device 12 and thus before data device 12 is placed out in the field. This feature not only saves the time and cost of having to either send someone out into the field to reprogram data device 12 or send data device 12 back for reprogramming.

Figure 16:
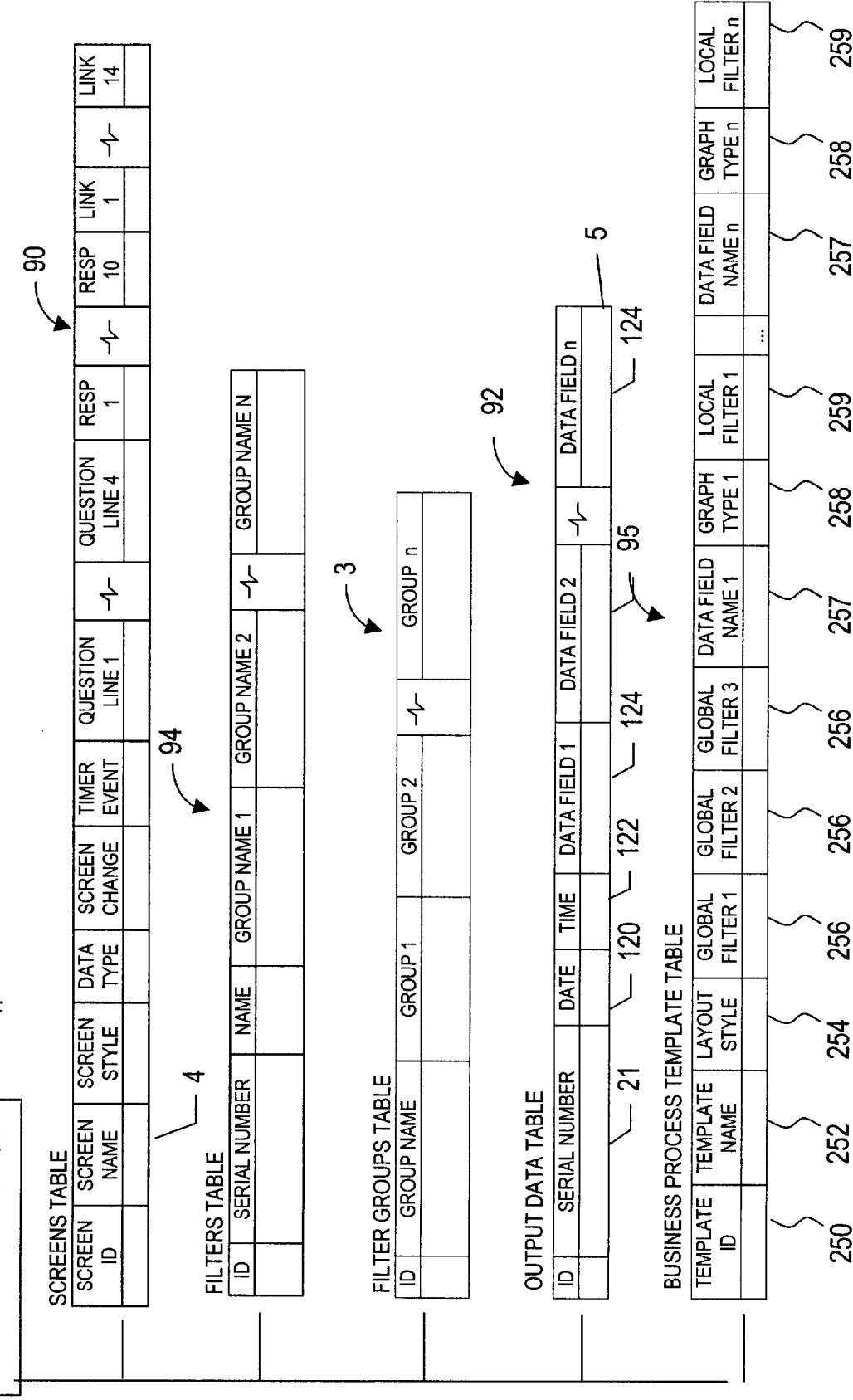
FIG. 16 is an example of a project database stored within the computer of FIG. 1.

As each of the input program records 62 of the input program are created, they are saved in a screens table 90 of a project database 47 stored within computer 14 as shown in FIG. 16. Each project database 47 represents a particular application for which data device 12 is being used and preferably includes a plurality of tables for storing data necessary for that particular application. In particular, project database 47 includes a screens table 90 for storing input program records 62, and in the case where user response data is being collected, at least one filter table such as filter table 94 for storing a plurality of filter criteria 96, an output table 92 for storing output records 5, and at least one data analysis template table 95 for storing data analysis templates 35 which define how user response data stored in output records 5 of output table 92 will be analyzed.

Figure 18:
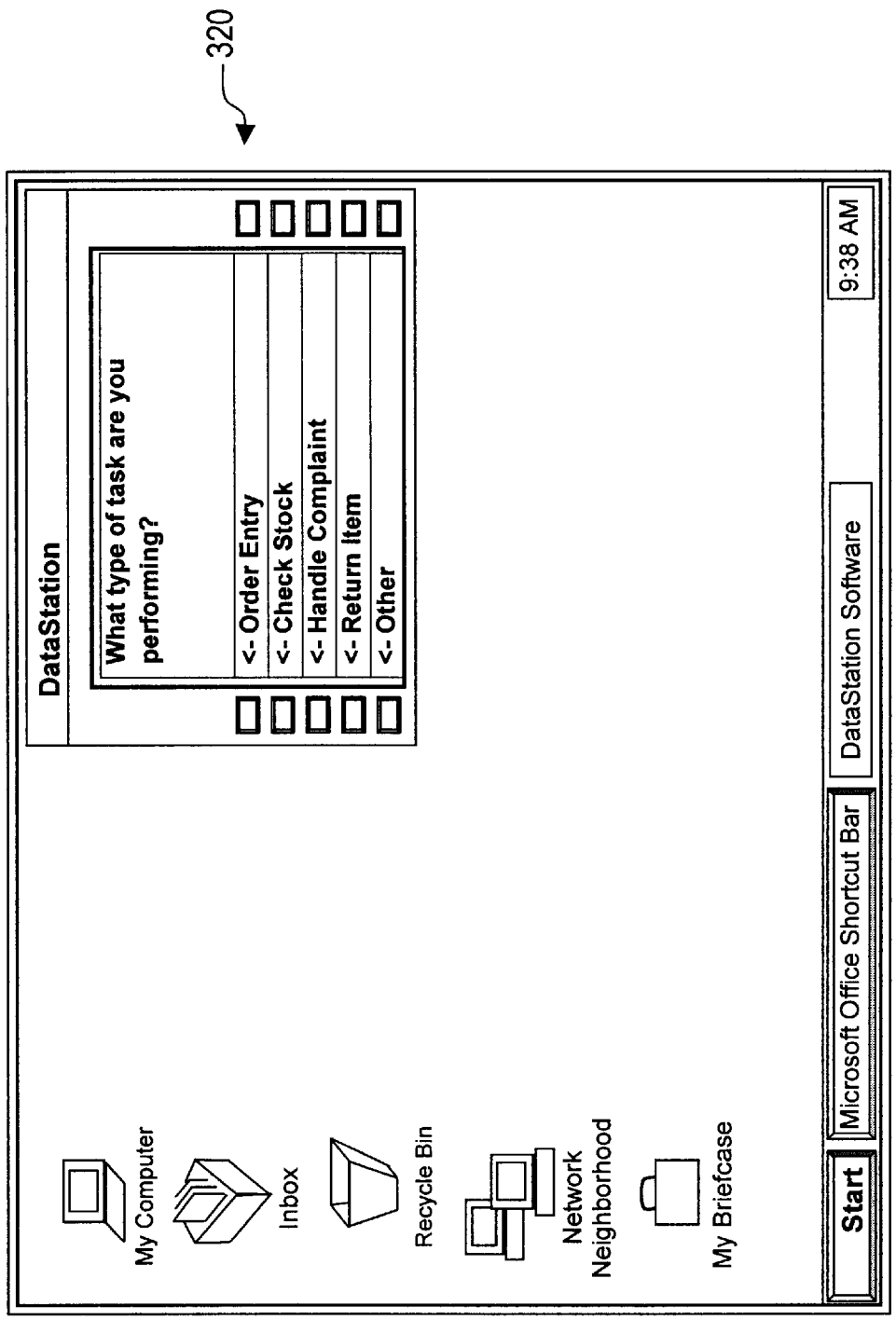
FIG. 18 is an example of a data device for the interactive computer system of FIG. 1 implemented via software.

While the present invention has been described in connection with data device 12 of FIG. 2, the data device could alternatively be implemented on a personal computer or network having software which acts as a front-end software component of project database 47, rather than utilizing a hardware device such as data device 12. In particular, the software performs a similar function as the operating software stored in first memory device 56 of data device 12. This software allows the user to access a project database 47 stored either on the user's computer or on a network or internet server in order to create a user interface for providing information to and/or collecting user response data from the user. With such a configuration, screen table 90 may be accessed directly from the user's computer via the software in order to determine what will be displayed on the user's computer. Any user response data collected from the user's computer can be stored directly in the appropriate data output field 124 of output table 92 of project database 47 (see FIG. 16), thereby eliminating the need to transport physical data device 12 to the necessary data collecting locations, as well as the need to transfer the collected user response data inputted to data device 12 to computer 14 via communications cable 16. An example of a software-generated display screen 2 run on such a software platform is shown in FIG. 18. As shown, display screen 2 mirrors display screen 22 and input keys 24 of data device 12. However, it can be appreciated by one skilled in the art that the type and style of the user interface could be varied to suit a particular application.

The software described above is further explained with reference to FIG. 22 and display screen 320 shown in FIG. 18. In particular, at 600, when a link event is activated, at 602 the software queries screens table 90 of project database 47 for a record in which screen id field 25 equals the screen id identified in screen id field 66 for the display screen 22 currently being displayed. At 604, a check is made as to whether the link event activated is inactive (i.e., equal to zero). If not, at 606 a check is made as to whether any user response data is being collected by the currently displayed display screen 22. If so, at 608, the user response data is recorded directly in the data output field 124 in output table 92 having a name equal to the screen name listed in screen name field 4 for the current display screen 22 being displayed.

At 610, a check is made as to whether the link event activated at 600 equals the screen id of the first screen id listed in screens table 90. If so, at 612, all of the data output fields 124 of non-displayed display screens 22 of the current output record 5 are set to zero, and at 614, a new output record 5 is added to output table 92. If not, at 616, the software queries screen table 90 for a screen id equal to the link event activated at 600, at 618 the screen attributes of the record in screen tables 90 corresponding to that screen id are obtained, and at 620, a new display screen 22 having that screen id is displayed. Once a new display screen 22 has been displayed or if the link event activated at 604 equals zero, the software awaits the activation of the next link event.

Figure 9:
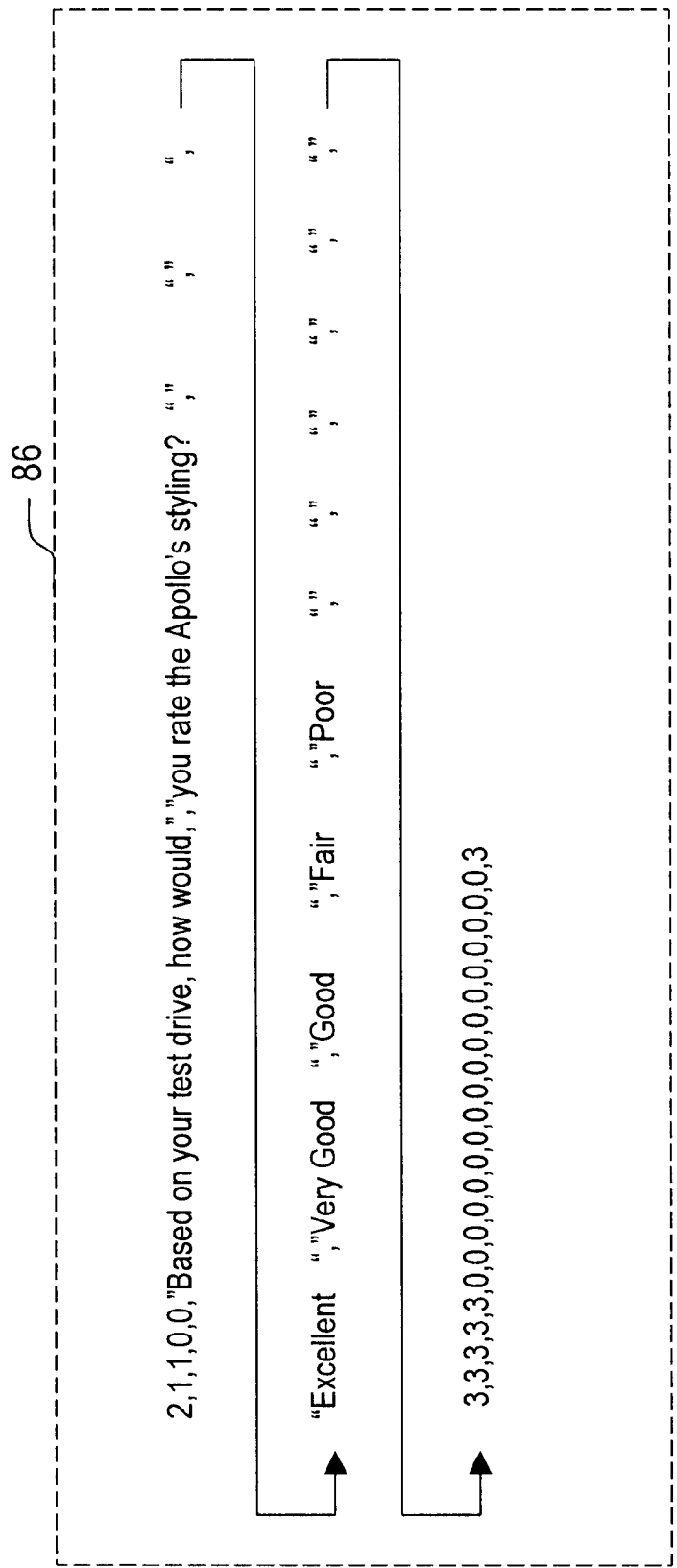
FIG. 9 is an example of an input text file for the input record of FIG. 5.

Once all of the necessary input program records 62 are created, an input text file 86, a representative sample of which is shown in FIG. 9, is then created from the appropriate input program fields 64 of each input program record 62 in screens table 90. Referring to the input program record 62 of FIG. 5 and the screen attributes shown in FIG. 7, one line of the input text file 86 shown in FIG. 9 indicates that it is the second display screen 22, it will display one question and ten responses (five of which are not being used), it will accept a one byte user response data, the screen will not change until a user of data device 12 inputs her user response data via an input key 24 having an active link event, and that no timer function attributes are defined. The question being displayed in question field 76 is "Based on your test drive, how would you rate the Apollo's styling?", and the available responses displayed in response field 78 are "EXCELLENT," "VERY GOOD, " "GOOD," "FAIR" and "POOR." Link field 80 indicates that when a user hits any of the input keys 24 on the left side of display 20, display screen 22 will change to the display screen 22 having screen id number "3".

The user response data collected by data device 12 is stored in an output record 5 within second memory device 58. Once all of the user response data has been collected, it is then transferred to output table 92 of FIG. 16. Output table 92 is created directly from screens table 90 (see FIG. 16)

without the need for additional programming. Output table 92 is created by taking the screen name identified in screen name field 4 of each input program record 62 of screens table 90 (i.e., each row in screens table 90) and essentially pivoting it to be used as the name of an data output field 124 (i.e., column) in output table 92. Once a link event which changes display screen 22 back to the first display screen 22 is activated, any user response data collected from the previous display screens 22 is stored in output record 5, and all of the data output fields 124 are set to zero so that a new output record 5 may be created. With such a configuration, the user response data collected by data device 12 will be in the proper position to be read directly into the correct output record 5 of output table 92 when transferred from data device 12 to computer 14.

As previously mentioned, computer 14 may also be programmed to create one or more filter tables for storing a plurality of filters and corresponding filter criteria that can be used to analyze the user response data collected by data device 12. One preferred embodiment of two filter tables are shown in FIGS. 10A and 10B for use in connection with an automotive application. Standard filter table 94 of FIG. 10A represents a filter table comprising a plurality of standard filters which include a data device serial number filter 91 representing the serial number assigned to each data device 12 collecting user response data, and a location name filter 93 representing the name of the location of each data device 12 collecting user response data.

Attributes associated with each location named in filter table 94 may be furthered filtered through group filters defined in group filter table 3 of FIG. 10B. If group filters are desired, group filter table 3 is created before standard filter table 94. In the group filter table 3 shown in FIG. 10B, two group filters are defined, namely a dealer region filter 8 and a dealer size filter 11. Each one of the group filters defined in group filter table 3 corresponds to a dealer region column 29 and dealer size column 39, respectively, in standard filter table 94. The dealer region filter 8 is assigned a plurality of dealer region filter criteria representing various dealer regions in which each location named in filter table 94 is located. The dealer size filter 11 is likewise assigned a plurality of dealer size filter criteria representing various sizes of each of the locations named in filter table 94. In the example shown in FIG. 10B, the dealer region filter criteria of dealer region filter 8 include "Northwest", "South", "Midwest", "Upper Midwest", and "West", and the dealer size filter criteria of dealer size filter 11 include "-High Volume", "Average Volume", and "Low Volume".

Once group filter table 3 is created, any of the dealer region filter criteria and dealer size filter criteria defined therein may be entered into dealer region filter field 29 and dealer size filter field 39, respectively, of standard filter table 94 for each location named therein. In the standard filter table 94 shown in FIG. 10A, data device 12 having serial number 197056 is located at Brown Motors, which is part of the Southern dealer region, and which has an average volume size. With such a configuration, the data analyst can filter the data collected by data device 12 by dealer region, dealer size or any combination thereof. While the standard and group filter tables 3 and 94 shown in FIGS. 10A or 10B relate to an automotive application, it can be understood by one skilled in the art that the standard and group filter tables may define other filters and corresponding filter criteria, depending on the application or applications for which data device 12 is being used.

Figure 17A:
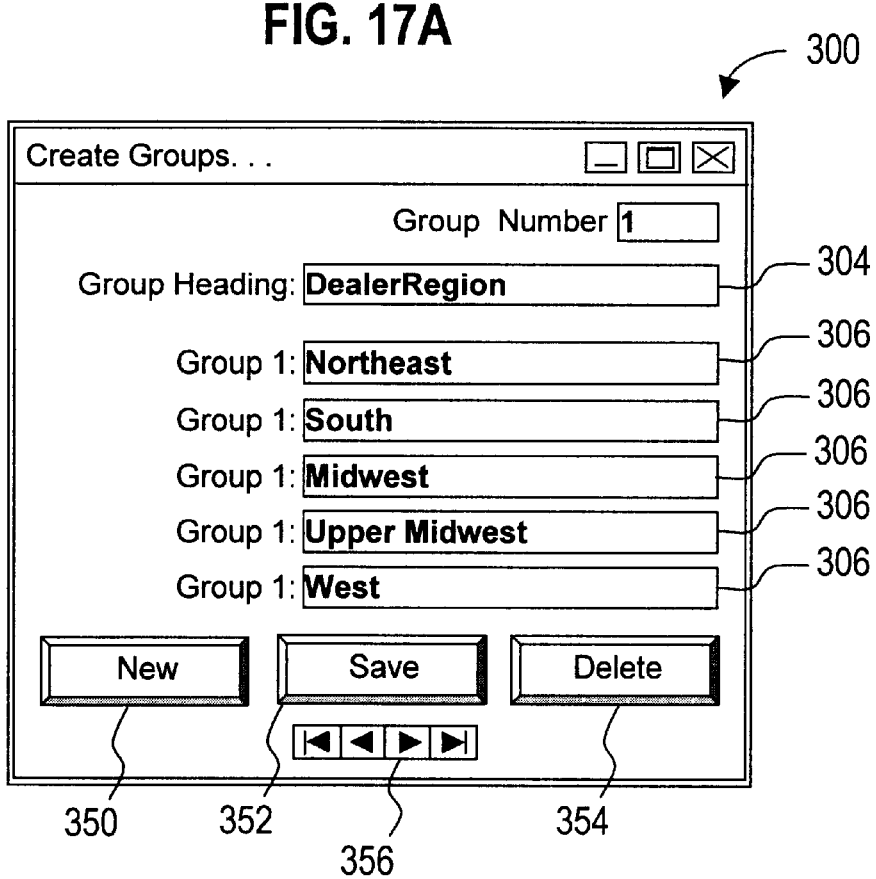
FIGS. 17A and 17B are examples of filter forms for creating the filter tables of FIGS. 10A and 10B.
Figure 17B:
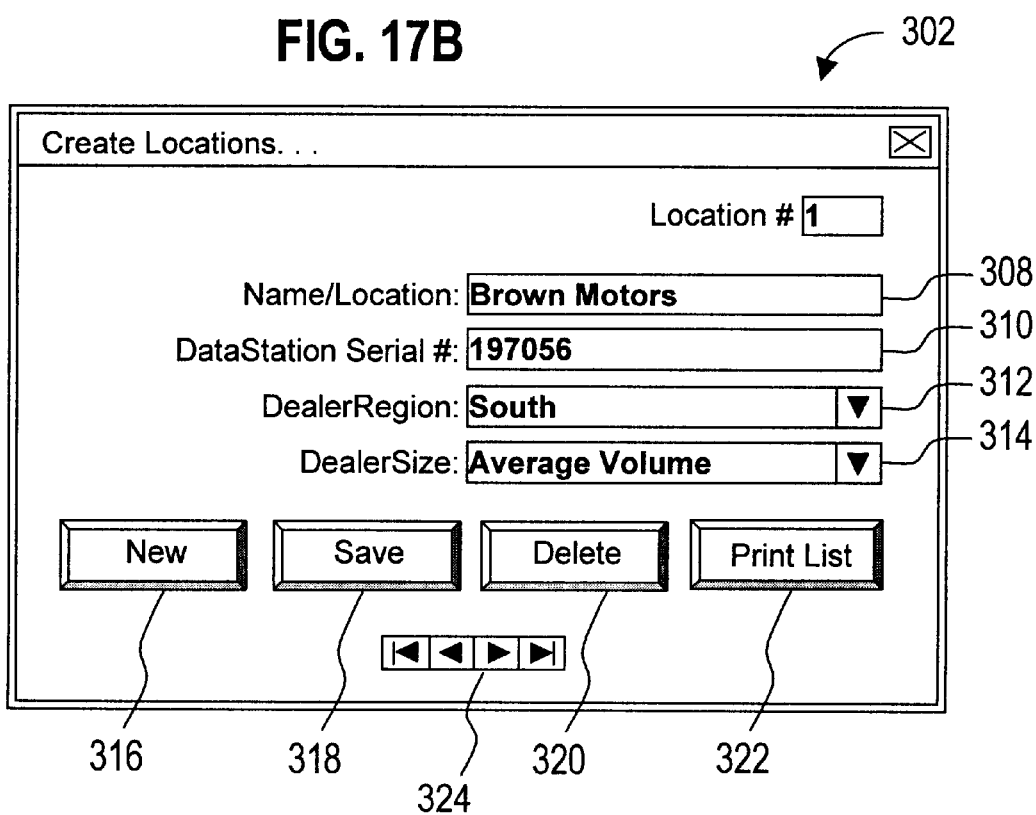

Standard and group filter tables are created via filter forms stored within computer 14. Examples of a group filter form 300 and standard filter form 302 for creating group filter table 3 and standard filter table 94, respectively, are shown in FIGS. 17A and 17B. As shown in FIG. 17A, each group filter of group filter table 3 is assigned a group filter name via group filter name field 304. A plurality of group filter criteria may then be assigned to each such group filter name via group filter criteria fields 306. All group filter and corresponding group filter criteria defined by group filter form 300 are added, saved and deleted via group filter add button 350, group filter save button 352 and group filter delete button 354, respectively. The user can maneuver between various group filters via group filter control buttons 356.

Once the group filter table has been created, standard filter table 94 of FIG. 10A may then be created via standard filter form 302 as shown in FIG. 17B. From standard filter form 302, location name filter 93 and data device serial number filter 91 can be entered into location name filter field 308 and data device serial number field 310, respectively, of standard filter form 302. The dealer region filter criteria and dealer size filter criteria defined in group filter table 3 can also be assigned in standard filter form 302 via pull down menus 312 and 314, respectively. The standard filters are added, saved and deleted via standard filter add button 316, standard filter save button 318 and standard filter delete button 320, respectively. Standard filter form 302 also preferably includes a standard filter print button 322 from which the user can print standard filter table 94. The user can maneuver between various standard filters via standard filter control buttons 324.

Figure 11:
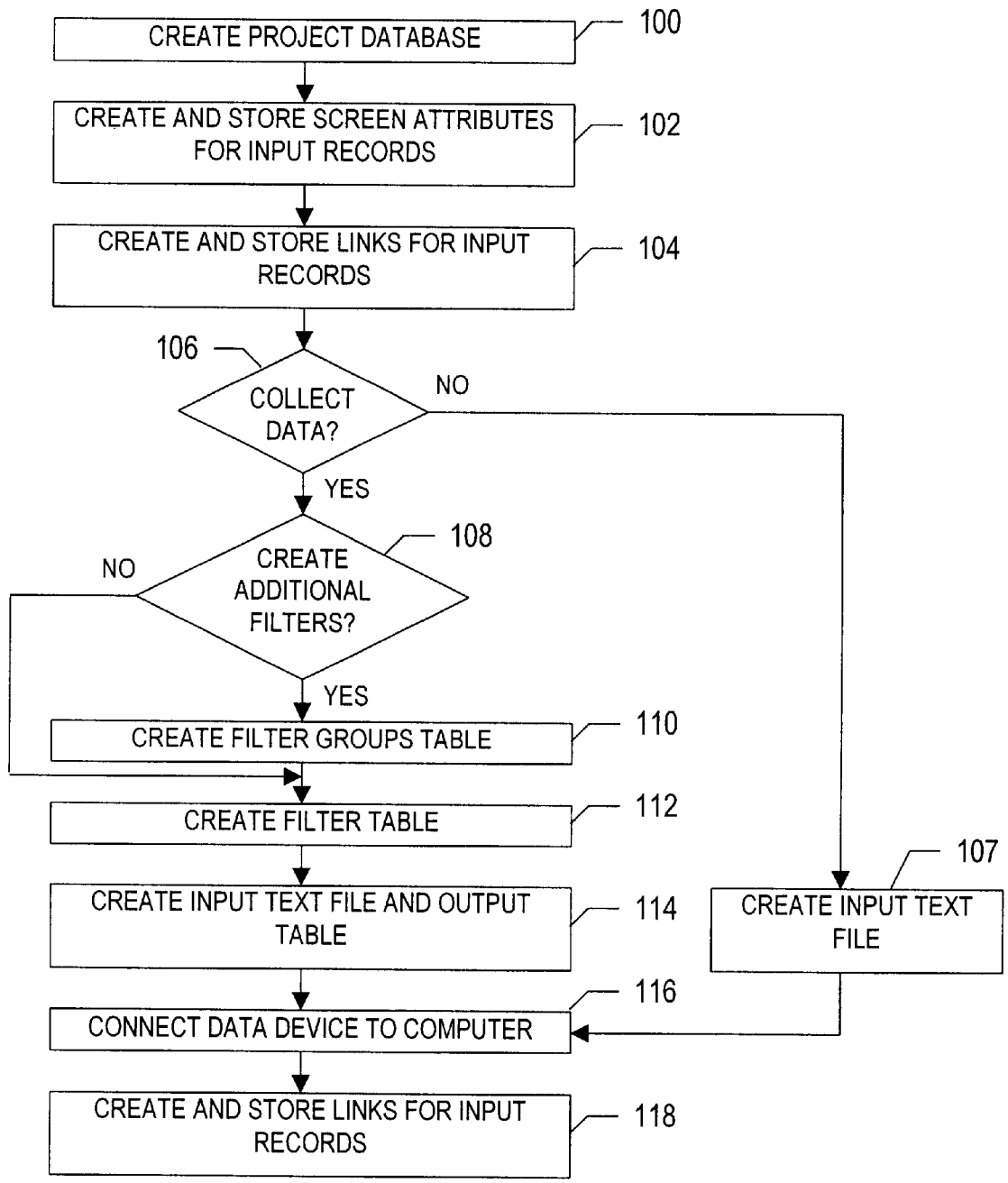
FIG. 11 is a flowchart for creating the input program of the computer of FIG. 1 and transferring it to the data device of FIG. 2.

To program data device 12 for use, the input program is first created on computer 14. As shown in FIG. 11, at 100, the user of computer 14 creates a project database (see FIG. 16) into which the input program records 62 are stored, and where user response data is being collected, filter tables 94, output table 92 and data analysis template tables 95 (as later explained herein) are also to be stored. If more than one project database is created, each one is assigned a unique project file name on computer 14. At 102, all of the screen attributes of input program records 62 except link events are created. As each input record 62 is created, it is stored in screens table 90 (see FIG. 16). Once two or more input program records 62 (and thus display screens 22) have been created and stored, at 104, the user of computer 14 links various display screens 22 together based on a plurality of link events such as those based on timer 52 (e.g., a timed display screen change), an external event received by data device 12 via first or second data device communications ports 34 or 36 (e.g., the receipt of a phone call), or user response data inputted to data device 12 (e.g., the depression of an input key 24).

At 106, it must be determined whether data device 12 will be collecting user response data or merely providing information. If it will be collecting user response data, at 108, the user of computer 14 has the option of creating one or more group filters, and if desired, at 110 one or more group filter tables 3 are created and corresponding group filter criteria are defined. If no group filter tables 3 are needed, the user can then create a standard filter table 94 at 112 and define corresponding standard filter criteria. At 114, the user can then create input program text file 86 from the input program by scanning screens table 90, and since data device 12 is being used to collect user response data, output table 92 may be created directly from screens table 90 for storing the output records 5 transferred from data device 12. If no user response data is being collected at 106, input text file 86 would be created at 107 by scanning screens table 90. At 116, the communications port of computer 14 (not shown) is connected to first data device communications port 34 of data device 12 via communications cable 16.

Figure 12:
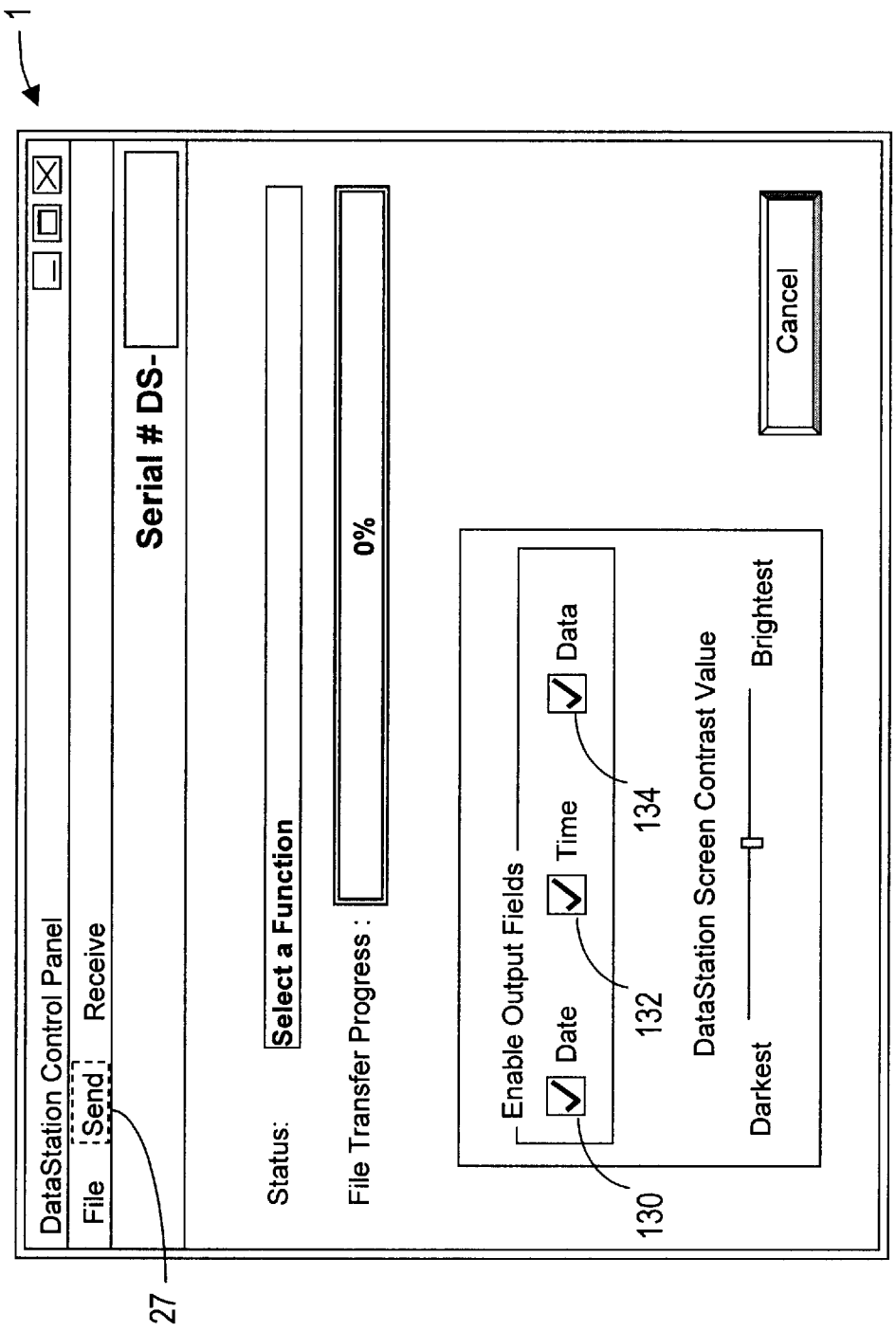
FIG. 12 is an example of a control panel screen for sending and receiving data between the computer and data device of FIG. 1.

Once the proper handshaking has occurred between data device 12 and computer 14, at 118 input program text file 86 is transferred from computer 14 to second memory device 58 of data device 12. In particular, as is further shown in FIG. 12, the user of computer 14 is provided with a control panel screen 1 from which she can enter the name of the input program text file 86 to be transferred from data device 12. From control panel screen 1, a user of computer 14 can also activate one or more output fields of an output record 5. Referring to FIG. 13, such output fields may include a date output field 120 representing the date on which output record 5 was created, a time output field 122 representing the time when output record 5 was created, and an data output field 124 representing the actual user response data collected by data device 12. As is shown in FIG. 13, output record 5 may also include a serial number output field 21 representing the serial number of the data device 12 from which output record 5 was stored. The serial number can be read from the miscellaneous block in second memory device 58 at the start of the data transfer from data device 12 to computer 14, stored in a variable, and written at the beginning of each line in output record 5. Referring back to control panel screen 1 of FIG. 12, date output field 120, time output field 122 and data output field 124 data fields 9 may be enabled or disabled via date control box 130, time control box 132 and data control box 134 and those output fields that are enabled will thus be recorded in output record 5. Referring back to the first example of an output record 5 shown in FIG. 13, output record 5 for data device 12 having serial number 197177 was created on Jul. 1, 1998 at 9:54 a.m. and the user response data collected by data device 12 for the first display screen 22 is a 1 byte integer value (as previously defined by input program record 62 of FIG. 5), and the user response data collected by the second to last display screen 22 is a timestamp.

Once the name of the input program text file 86 has been entered and the desired date output field 120, time output field 122 and data output field 124 have been enabled via control panel 1, the user of computer 14 can then select the "send" command 27 from the menu bar of control panel screen 1 and send input program text file 86 to second memory device 58 of data device 12. Once input program text file 86 has been completely transferred, data device 12 resets itself and the input program is activated. The connection between data device 12 and computer 14 may then be removed and data device 12 is now ready for use.

In the case where data device 12 is being used to collect user response data (rather than merely to provide data), once data device 12 has completed collecting user response data, data device 12 may then be reconnected to computer 14 to transfer the user response data stored in second memory device 58 of data device 12 to output table 92 of project database stored within computer 14. The user response data can be transferred from control panel screen 1 of computer 14 in one of two ways; either directly into the appropriate data output fields 124 of output table 92, or into an output text file (not shown) which may then in turn be imported into output table 92 as output records 5 (see FIG. 16) or exported into another data analysis program such as Excel®. Once the user response data collected by data device 12 has been loaded into output table 92, it may then be analyzed by a data analysis mechanism (not shown) stored within computer 14.

The data analysis mechanism is created from the input program of computer 14 without the need for additional programming by the data analyst. The data analysis mechanism includes data analysis software (not shown) stored within computer 14, and a plurality of customizable data analysis templates 35 stored within at least one data analysis template table 95 of project database 47 (see FIG. 16) independently of the data analysis software such that the data analyst can automatically and selectively configure the data analysis mechanism of computer 14. Data analysis software is preferably a Windows® based program for ease of use by the data analyst.

Figure 14:
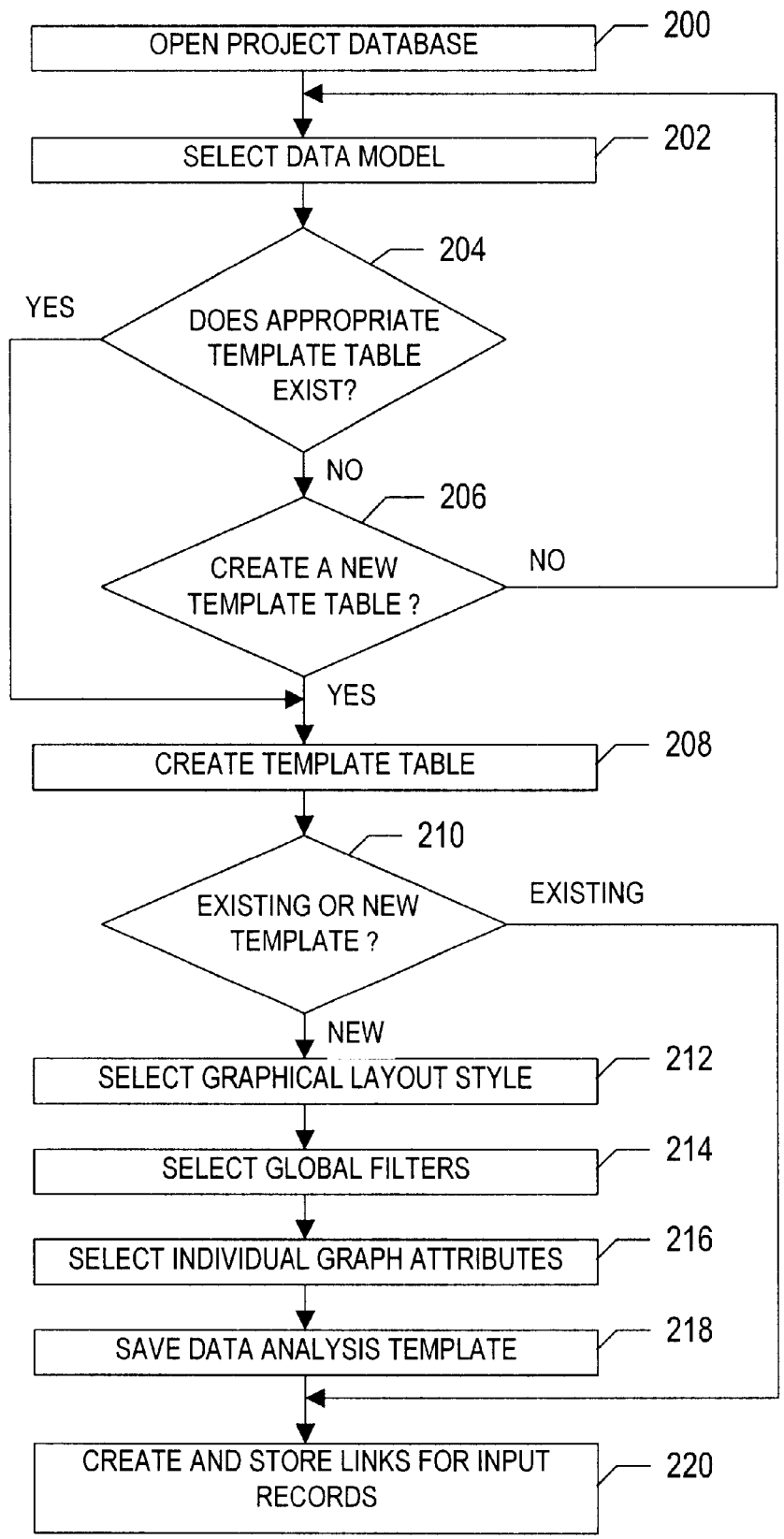
FIG. 14 is a flowchart for creating the data analysis mechanism of the computer of FIG. 1.

As is further shown in FIG. 14, the desired project database 47 stored within computer 14 must first be opened at 200 in order to begin the analysis of the user response data collected by data device 12. At 202, the data analyst will be asked to select a data model for analyzing the user response data collected by data device 12. The data models may include business process analysis, survey/customer satisfaction analysis, and demand analysis, as well as others depending on the needs of the data analyst. Each data model corresponds to a data analysis template table 95 of project database 47.

Based on the data model selected at 202, the data analyst will have the option at 204 to launch an existing data analysis template table 95 (see FIG. 16). If no data analysis template tables 95 corresponding to the data model selected at 202 exist, at 206 the data analyst has the option at 208 to create a new data analysis template table 95 for the selected data model. Once an existing data analysis template table 95 is selected or a new data analysis template table 95 is created, at 210 the data analyst has the option to either select an existing data analysis template 35 or create a new data analysis template 35 from which the data analysis software configures the manner in which the user response data in data output field 124 of output record 5 will be analyzed and displayed to the data analyst. If the data analyst wishes to use an existing data analysis template 35, at 220 the desired data analysis template 35 and corresponding user response data collected by data device 12 may be loaded on the data analyst's computer so that it can be viewed by the data analyst.

If the data analyst wants to create a new data analysis template 35, at 212, a graphical layout is selected. The graphical layout defines how many graphs to display and the manner in which they will be displayed to the data analyst. At 214, the data analyst selects global filter criteria to be assigned to each and every graph defined in the graphical layout selected at 212 for filtering the user response data collected by data device 12. The global filter criteria define filters to be applied for all graphs defined by the graphical layout. The global filters criteria may be those filter criteria defined in standard and group filter tables 94 and 3, respectively, or the data contained in the data output fields 124 of output record 5.

Figure 19:
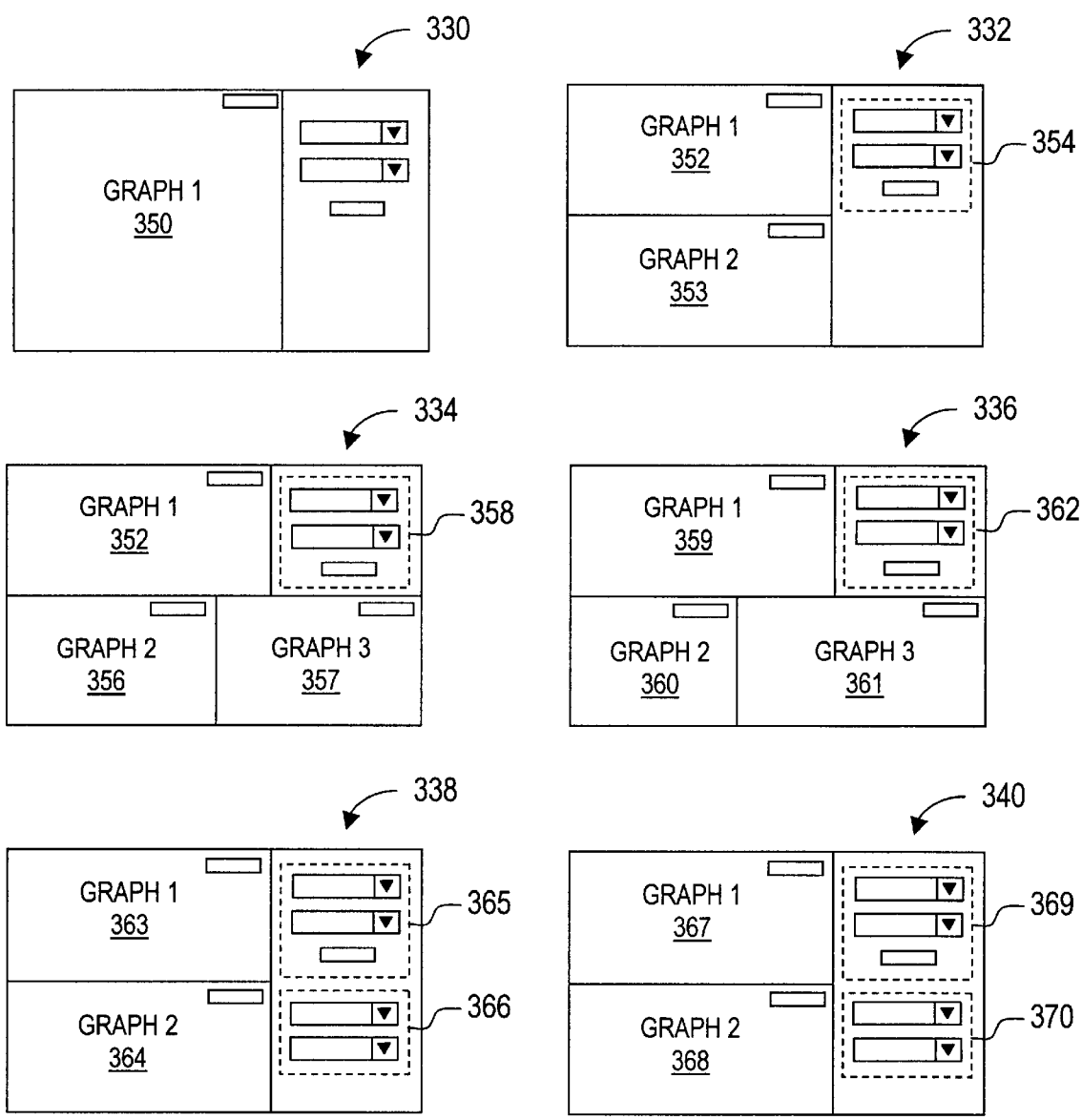
FIG. 19 shows a plurality of graphical layouts which may be created by the data analysis mechanism of FIG. 14.

Illustrative examples of six graphical layouts implementing such global filter criteria are shown in FIG. 19. Graphical layout 330 shows a single graph 350 with one set of global filter criteria 351. Graphical layout 332 shows two graphs 352 and 353 with one set of global filter criteria 354. Graphical layout 334 shows three graphs 355, 356 and 357 with one set of global filter criteria 358 in which graph 356 has the same width as graph 357, whereas graphical layout 336 shows three graphs 359, 360 and 361 and one set of global filter criteria 362 where the width of graph 360 is smaller than that of graph 361. Graphical layout 338 shows two graphs 363 and 364 with two sets of global filter criteria 365 and 366. With such a configuration, a data analyst can simultaneously compare the same set of user response data collected by data device 12 based on different global filter criteria. Using the group and standard filter tables 3 and 94 shown in FIGS. 10A and 10B, the data analyst can compare the "South" region against the "Midwest" region. Graphical layout 340 also shows two graphs 367 and 368 with two sets of global filter criteria 369 and 370, but each graph is tied to a different project database 47. With such a configuration, the data analyst can compare the results of two different studies, such as one done in 1996 and one done in 1997.

Referring back to FIG. 14, at 216, the user of computer 14 may select a plurality of graph attributes for each graph defined in the graphical layout selected by data analyst at 212. Such graph attributes include a graph type (pie, bar, etc.), a data output field 124 from output table 92, and one or more local filter criteria to be applied to each graph independently of any other graphs defined by the graphical layout. At 218, once the data analysis template 35 has been completed, the data analyst saves the data analysis template 35 in the appropriate data analysis template table 95 of project database 47 stored within computer 14 (see FIG. 16). While the data analysis mechanism of computer 14 has been described with reference to FIG. 14, any of the data analysis template tables and corresponding data analysis templates and features thereof may be automatically and selectively changed by the data analyst at any time after they have been created.

Referring back to FIG. 16, each data analysis template table 95 and corresponding data analysis templates 35 created by the data analyst or already existing in project database 47 comprises a plurality of template fields. The template fields for each data analysis template table 95 stored in project database 47 includes a template id field 250 and a template name field 252 representing a unique number and name, respectively, to be assigned to each data analysis template 35 stored therein. For the business analysis data model shown in FIG. 16, template fields also include a layout style field 254 which defines the graphical layout for displaying the user response data collected by data device 12 and analyzed by the data analysis mechanism of computer 14, and a plurality of global filter fields 256 which define the global filter criteria for data analysis template 35. Template fields also include at least one set of data field names field 257, graph type field 258 and local filter field 259 for each graph defined in the layout style field 254. The number and type of these additional template fields may vary depending on the data model selected by the data analyst.

Figure 15:
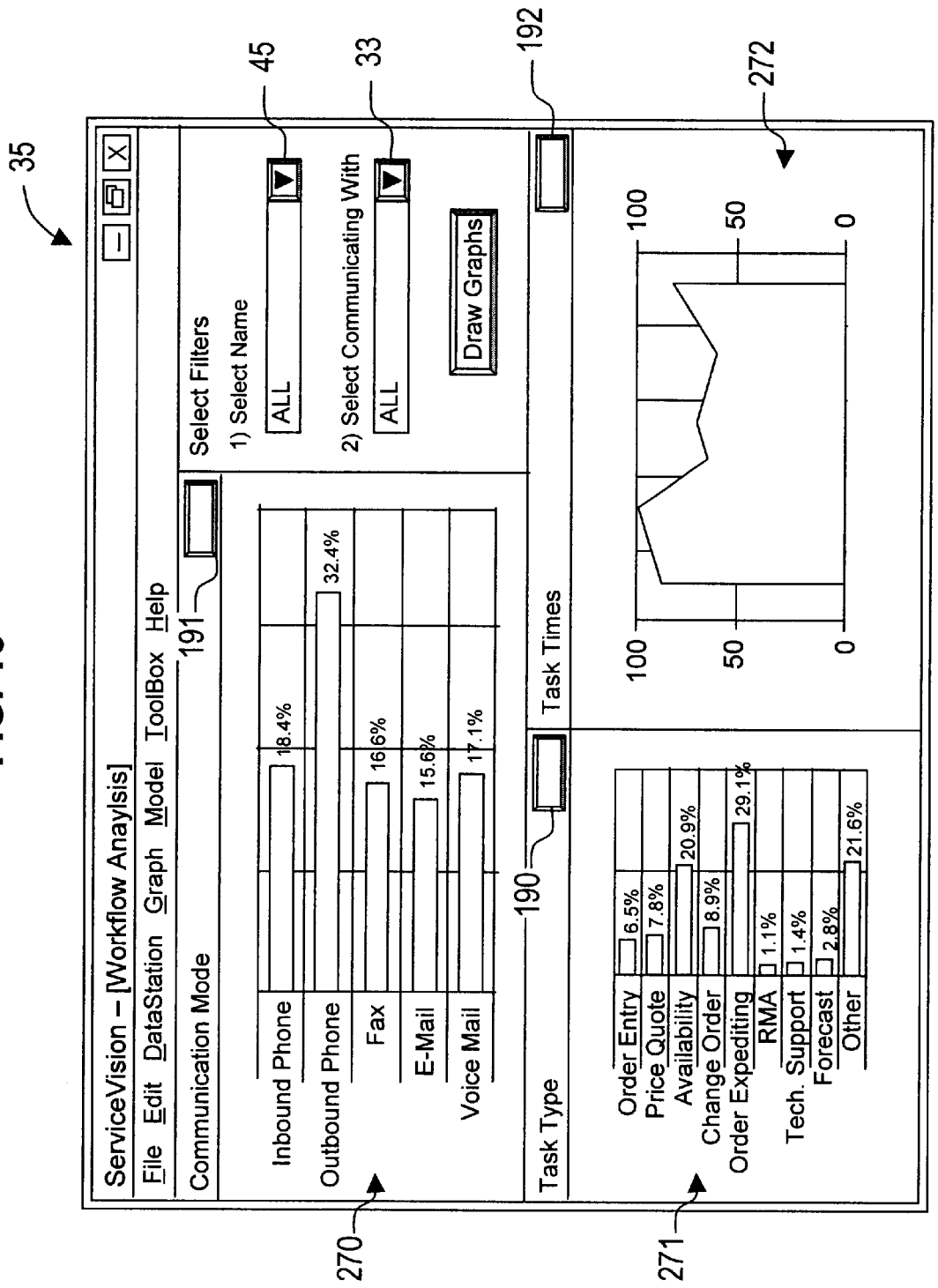
FIG. 15 is an example of a data analysis template showing user response data analyzed by the data analysis mechanism described in FIG. 14.

An example of a data analysis template 35 having user response data analyzed therein is shown in FIG. 15. The data analysis template shown is directed to the business process analysis data model. As can be seen, there are three different graphs 270, 271 and 272 displayed to the data analyst. The data analysis software within computer 14 allows the data analyst to select via pull down menu from a plurality of group and standard filter criteria stored within group and standard filter tables 3 and 94 via global filter buttons 33 and 45, which will affect all of the graphs 270, 271 and 272 displayed in FIG. 15. The data analysis software also preferably includes graph control buttons 190, 191 and 192 which allows the data analyst to edit various features of and values defined in each displayed graph 270, 271 and 273, respectively, independently of the other graphs, as well as for allowing for other functions such as printing and exporting. With such a configuration, the data analyst can selectively and automatically configure the manner in which user response data collected by data device 12 is analyzed. In addition, such reconfigured graphs can be saved as a new data analysis template 35 directly in data analysis template table 95 without the need to create it from scratch or via the steps shown in FIG. 14.

Figure 21:
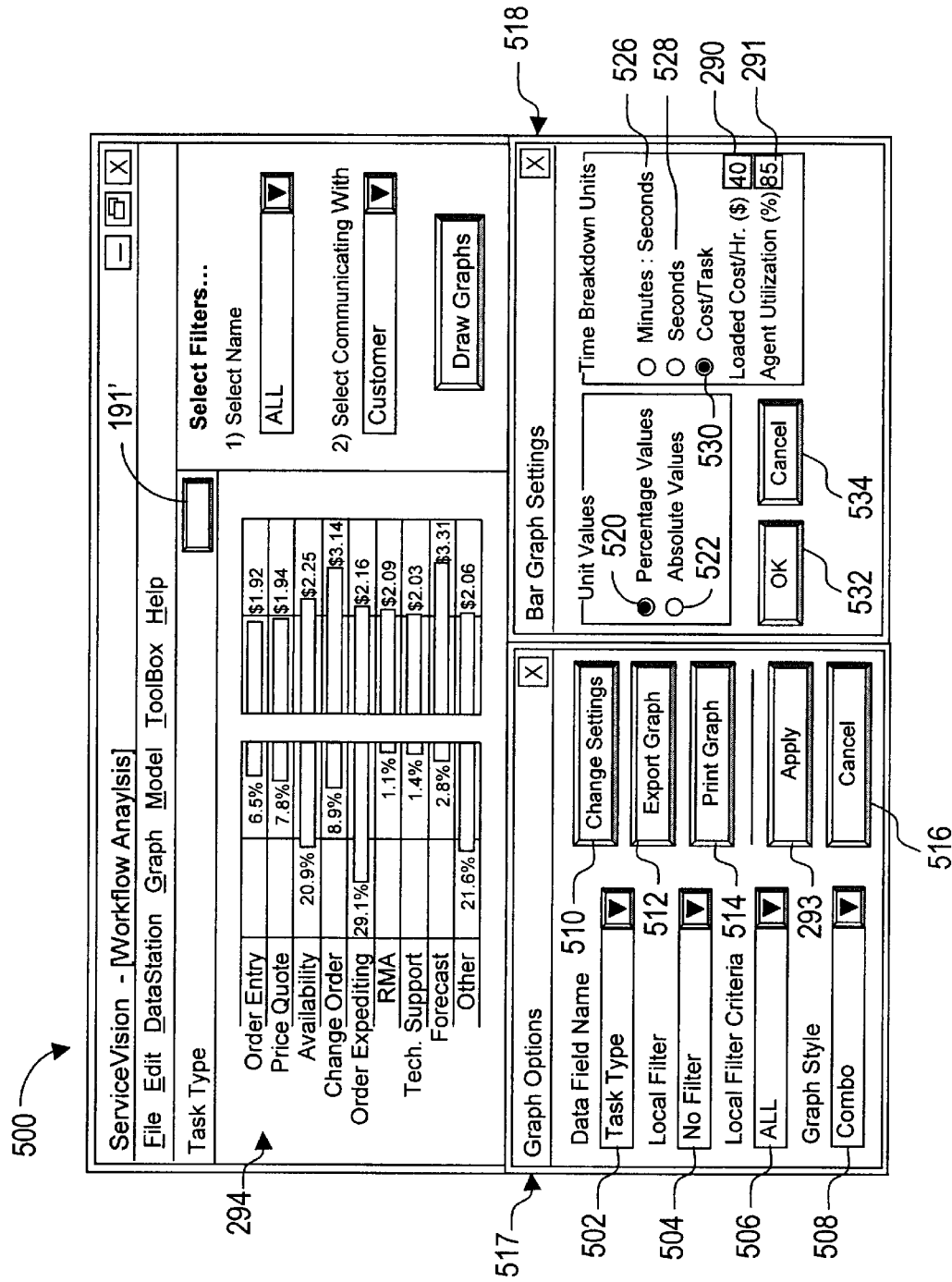
FIG. 21 shows an example of a data analysis template for activity-based-cost analysis.

For example, if the data analyst wished to change graph 270 of FIG. 15, she can do so by simply pressing graph control button 191. Upon pressing graph control button 191, a form 500 such as that shown in FIG. 21 is displayed to the data analyst from which the desired graph changes can be made. In particular, form 500 includes a graph options form 517 from which the data analyst can change attributes of graph 270 via graph options fields and graph options buttons contained therein. The graph options fields may include a data field name 502, a local filter field 504, a local filter criteria field 506 and a graph style field 508. Each of these graph options fields preferably include a pull down menu from which the data analyst can select the graph options listed therein. The graph options buttons may include a change settings button 510, an export graph button 512, a print graph button 514, an apply button 293, and a cancel button 516. Any changes to graph 270 may be saved directly in data analysis template table 95 of project database 47 either under the "old" data analysis template 35 from which graph 270 was stored, or as a new data analysis template 35.

Graph 294 includes a task type graph and activity-cost-based analysis of a graph depicting average task times for illustrative purposes. When the data analyst wants to change features of graph 294, she may do so by pressing change settings button 510, upon which a setting form 518 opens on the data analyst's computer for selecting various additional settings available for graph 294. The setting form 518 and corresponding settings contained therein may vary based on the graph style selected in graph style field 508. In the setting form 518 shown in FIG. 21, the data analyst can select how the task types identified in the task type graph of graph 294 will be displayed, either by percentages by pressing percentage value button, 520 or by volume by pressing an absolute value button 522.

Since the graph style chosen in graph style field 508 of FIG. 21 is "combo", graph 294 includes the activity-based-cost analysis of a graph which in this case, represents average task time values, and is displayed adjacent the task type graph. As a result, the settings identified in setting form 518 also include a minutes/seconds button 526, a seconds button 528 and a cost button 530 for analyzing the average task time for each task type displayed in the task type graph by minutes/seconds, seconds and cost, respectively. Setting form 518 also includes a cost field 290 in which the data analyst can enter the total estimated hourly cost of the resource using data device 12 (such as a user of data device 12), and a utilization field 291 in which the data analyst can enter a utilization percentage (e.g., how much can any given person actually works in any given hour period). The settings selected by the data analyst may be cancelled by pressing a settings cancel button 534. Once all of the settings have been selected and saved by the data analyst via an okay button 532, upon pressing the apply button 293, graph 294 comprising task type graph and activity-cost-based graph will be displayed having the graph options and settings selected from graph options form 517 and setting form 518. From the activity-based-cost analysis, the data analyst is automatically provided with critical information as to what drives the costs of doing business. The technique of activity-based-cost analysis can be applied to other types of graphs (e.g., histogram) that depict time-based data output fields 124.

Figure 20:
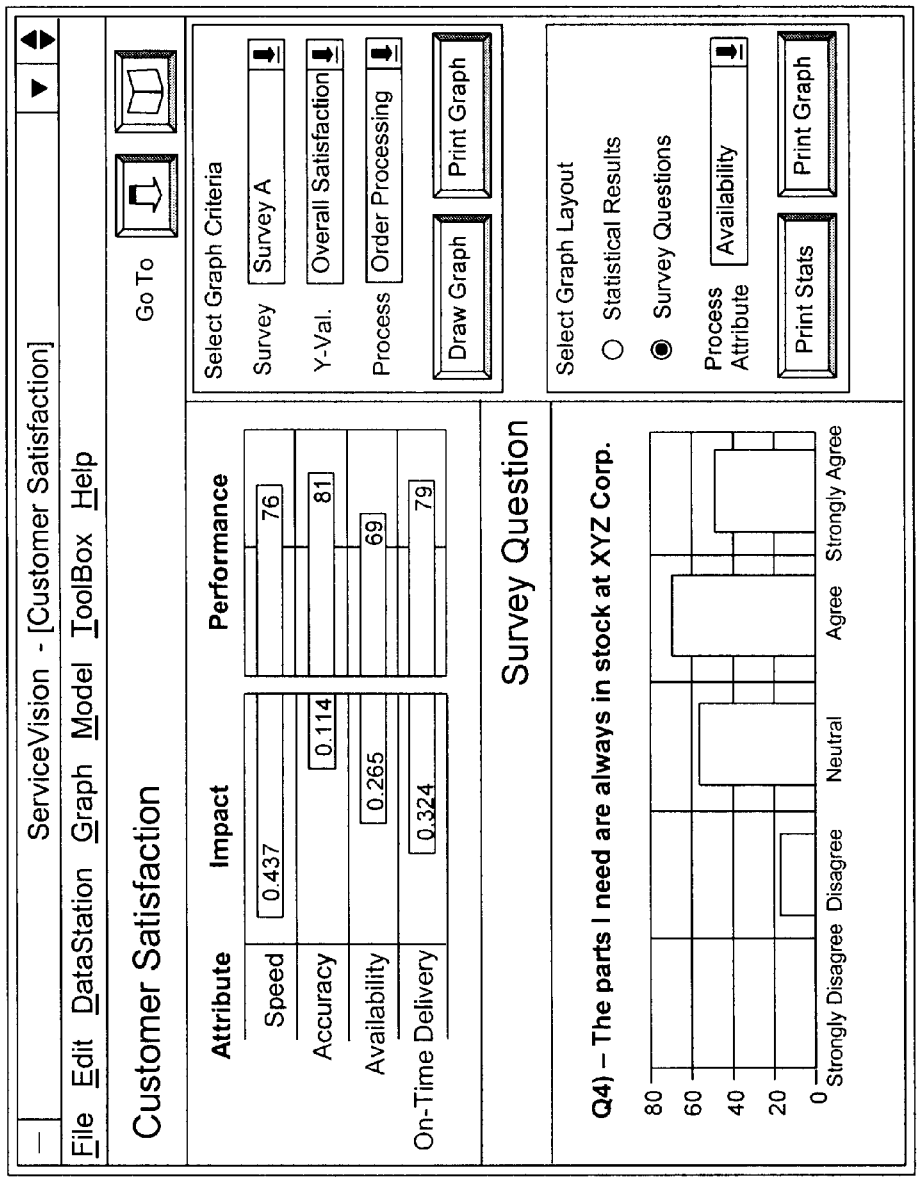
FIG. 20 shows another example of a data analysis template showing user response data analyzed by the data analysis mechanism of FIG. 14.

FIG. 20 shows another example of user response data analyzed by the data analysis mechanism of computer 14 based on a survey/customer satisfaction data model. One of the key goals with this type of analysis is to determine how certain attributes correlated with survey questions drive desired customer behavior (i.e., customer satisfaction, willingness to recommend to a friend, willingness to repurchase, etc.) by using multiple regression analysis. However, the present invention allows the data analyst to selectively and automatically configure the data analysis mechanism of computer 14, thereby saving the data analyst tremendous amounts of time. Moreover, the data analysis mechanism of computer 14 also allows the data analyst to automatically and selectively choose different data analysis templates 35 to analyze the user response data collected by data device 12 under this data model. With existing data analysis tools, the data analyst has to create each "data analysis template" from scratch, a time consuming and expensive alternative.

The foregoing constitutes a description of various preferred embodiments. Numerous changes to the preferred embodiments are possible without departing from the spirit and scope of the invention. Hence, the scope of the invention should be determined with reference not to the preferred embodiments, but to the following claims.

We claim:

1. A method of providing data to a user, said method comprising the steps of:

providing a user with a data device, said data device comprising a housing, display means included on said housing for displaying a plurality of display screens to a user of said data device, input included on said housing for inputting at least one of user response data and user commands to said data device, a processor contained within said housing which is adapted to control the operation of said data device, memory means coupled to said processor which is adapted to store operating software for operating said data device and an application-specific input text file to be interpreted by said operating software, said input program by itself defining said display screens for said data device, whereby said data device can be programmed to be used for the plurality of different applications solely by modifying the input text file, and data device communications means included on said housing for a communications between said data device and computer;

creating said input text file via said computer;

connecting said device to said computer via said data device communications means and said computer communications means;

transferring said input text file from said computer to said memory means of said data device;

creating an output table within said computer directly from said input text file without the need for additional programming;

transferring said user response data inputted to said data device to said output table without said computer; and analyzing said user response data stored in said output table via data analysis means stored within said computer.

2. A data device, comprising:

a housing;

display mean s included on said housing for displaying a plurality of display screens to a user of said data device;

input means included on said housing for inputting at least one of user response data and user commands to said data device;

a processor contained within said housing which is adapted to control the operation of said data device; and memory means coupled to said processor for storing operating software for operating said data device and for storing an application-specific input text file to be interpreted by said operating software which by itself defines said display screens for said data device, whereby said data device can be programmed and reprogrammed to be used for a plurality of different applications solely by modifying the input text file, wherein the input text file comprises a plurality of screen fields into which a plurality of screen definitions are stored, and at least one link field into which a link event is stored, the occurrence of which causes the display screen displayed by the data device to change.

3. The data device of claim 2, wherein the plurality of screen fields comprises a screen identification field for storing a unique number assigned to each display screen of the data device, a screen style field for storing a plurality of different screen styles, and a screen change field for storing a screen change event, the occurrence of which causes the screen displays to change in a predetermined period of time.

4. The data device of claim 2, further comprising communications means included on said housing for allowing communication between said data device and a remote computer, such that said input text file may be transferred from said computer to said data device.

5. An interactive computer system, comprising:

a data device, said data device comprising:

a housing;

display means included on said housing for displaying a plurality of display screens to a user of said data device;

input means included on said housing for inputting at least one of user response data and user commands to said data device;

a processor contained within said housing which is adapted to control the operation of said data device;

memory means coupled to said processor for storing operating software for operating said data device and for storing an application specific input text file to be interpreted by said operating software which by itself defines said display screens for said data device; and data device communications means provided on said housing for allowing communication to and from said data device; and a computer having computer communications means for connecting said computer to said data device communications means of said data device, said computer comprising means for creating said input text file, whereby said data device can be easily programmed and reprogrammed to be used for a plurality of different applications solely by modifying the input text file, wherein the input text file comprises a plurality of screen fields into which a plurality of screen definitions are stored, and at least one link field into which a link event is stored, the occurrence of which causes the display screen displayed by the data device to change.

6. The interactive computer system of claim 5, wherein the plurality of screen fields comprises a screen identification field for storing a unique number assigned to each display screen of the data device, a screen style field for storing a plurality of different screen styles, and a screen change field for storing a screen change event, the occurrence of which causes the screen displays to change in a predetermined period of time.

7. The interactive computer system of claim 5, wherein said memory means comprises output storage means for storing said user response data inputted to said data device.

8. The interactive computer system of claim 7, wherein said programming means comprises an output table created directly from said input text file without the need for additional programming, said output table being adapted to store said user response data inputted to said data device when transferred from said output storage means of said memory means of said data device to said computer.

9. The interactive computer system of claim 5, further comprising:

screen creation means for creating said display screens; and link means for linking at least one of said display screens to at least another of said display screens based on at least one of a time, an external event received by said data device via said data device communications means and said user response data inputted to said data device.

10. The method of claim 9, further comprising the steps of:

creating an output table within said computer directly from said input text file without the need for additional programing;

transferring said user response data inputted to said data device to said output table without said computer; and analyzing said user response data stored in said output table via data analysis means stored within said computer.

11. The method of claim 9, wherein the step of creating said input text file comprises the steps of:

creating said display screens to be displayed on said display of said data device; and linking at least one of said display screens to at least another of said display screens based on at least one of a timer, an external event received by said data device via said data device communication means, and said data inputted to said data device via said input means.

12. A method of providing data to a user, said method comprising the steps of:

providing a user with a data device, said data device comprising a housing, display means included on said housing for displaying a plurality of display screens to a user of said data device, input means included on said housing for inputting at least one of user response data and user commands to said data device, a processor contained within said housing which is adapted to control the operation of said data device, memory means coupled to said processor which is adapted to store operating software of operating said data device and an application-specific input text file to be interpreted by said operating software; said input program by itself defining said display screens for said data device, whereby said data device can be programmed to be used for the plurality of different applications solely by modifying the input text file, and data device communications means included on said housing for allowing communications between said data device and computer;

creating said input text file via said computer;

connecting said device to said computer via said data device communications means and said computer communications means; and transferring said input text file from said computer to said memory means of said data device, wherein the input text file comprises a plurality of screen fields having a screen identifier, a link event, a screen style and a screen change event, and wherein the steps of creating said input text file comprises storing a plurality of screen definitions in said plurality of screen fields.

* * * * *